United States Patent
Goel et al.

(10) Patent No.: US 9,483,862 B2
(45) Date of Patent: Nov. 1, 2016

(54) GPU-ACCELERATED PATH RENDERING

(71) Applicant: QUALCOMM Incorporated, San Diego, CA (US)

(72) Inventors: Vineet Goel, La Jolla, CA (US); Usame Ceylan, Orlando, FL (US)

(73) Assignee: QUALCOMM Incorporated, San Diego, CA (US)

(*) Notice: Subject to any disclaimer, the term of this patent is extended or adjusted under 35 U.S.C. 154(b) by 397 days.

(21) Appl. No.: 14/137,760

(22) Filed: Dec. 20, 2013

(65) Prior Publication Data
US 2015/0178974 A1    Jun. 25, 2015

(51) Int. Cl.
*G06T 15/00* (2011.01)
*G06T 1/20* (2006.01)
*G06T 11/20* (2006.01)

(52) U.S. Cl.
CPC .............. *G06T 15/005* (2013.01); *G06T 1/20* (2013.01); *G06T 11/203* (2013.01); *G06T 2200/28* (2013.01)

(58) Field of Classification Search
CPC ....... G06T 17/20; G06T 15/005; G06T 1/20; G06T 2200/28; G06T 2210/52
See application file for complete search history.

(56) References Cited

U.S. PATENT DOCUMENTS

| | | | |
|---|---|---|---|
| 7,639,252 B2 | 12/2009 | Goel | |
| 7,696,993 B2 | 4/2010 | Prokopenko et al. | |
| 7,746,347 B1 | 6/2010 | Brown et al. | |
| 8,171,461 B1 | 5/2012 | Kilgard et al. | |
| 2010/0214294 A1* | 8/2010 | Li | G06T 17/20 345/423 |
| 2013/0063464 A1 | 3/2013 | Schneider et al. | |

OTHER PUBLICATIONS

Rice et al., "OpenVG Specification," Version 1.1, Dec. 3, 2008, 253 pp.
Zink et al., "Practical Rendering & Computation with Direct3D 11," Overview of Direct 3D, CRC Press, Nov. 2, 2011, pp. 4-7.
International Preliminary Report on Patentability for International Application No. PCT/US2014/068207, mailed Dec. 3, 2015, 6 pp.
Response to Written Opinion of Feb. 13, 2015, from International Application No. PCT/US2014/068207, filed Oct. 19, 2015, 20 pp.
International Search Report and Written Opinion—PCT/US2014/068207—ISA/EPO—Feb. 13, 2015, 10 pp.
Kilgard et al., "GPU-accelerated Path Rendering," Computer Graphics Proceedings, SIGGraph Asia, 2012, pp. 1-10.
Microsoft: "Programming Guide for Direct3D 11" Oct. 27, 2013, XP055167116, Retrieved from https://msdn.microsoft.com/en-us/library/windows/desktop/ff476345(v=vs.85).aspx on Feb. 3, 2015 (19 pages).

\* cited by examiner

*Primary Examiner* — Maurice L McDowell, Jr.
*Assistant Examiner* — Raffi Isanians
(74) *Attorney, Agent, or Firm* — Shumaker & Sieffert, P.A.

(57) ABSTRACT

A graphics processing unit (GPU) comprises a memory, and at least one processor configured to: receive a primitive type buffer comprising a plurality of primitive type entries, wherein each of a plurality of vertices of a vertex buffer of the GPU are associated with one or more of the plurality of primitive type entries, determine primitives based on the plurality of vertices and the associated one or more primitive type entries, and rendering, by the GPU, the primitives based on the plurality of vertices and the associated one or more primitive type entries of the primitive type buffer.

30 Claims, 7 Drawing Sheets

```
ctx->VSSetShader( NULL, NULL, 0 );
ctx->HSSetShader( pass1HullShader, NULL, 0 );
ctx->DSSetShader( pass1DomainShader, NULL, 0 );
ctx->GSSetShader( geometryShader, NULL, 0 );
ctx->PSSetShader( pixelShader, NULL, 0 );

ConstantBuffer cb;
cb.miterLimit  = path.miterLimit;
cb.strokeColor = path.strokeColor;
cb.strokeWidth = path.strokeWidth;
cb.joinRule    = path.joinRule;
cb.endcapRule  = path.endcapRule;
ctx->UpdateSubresource( CB, 0, NULL, &cb, 0, 0 );
```
← 120

```
// first pass sets TE dash state to NULL uint stride = sizeof( XMFLOAT2 );
uint offset = 0;
ctx->IASetVertexBuffers(0, 1, &path.vertexBuffer, &stride, &offset);
ctx->IASetPrimTypeBuffer(&path.primTypeBuffer, DXGI_FORMAT_R32_UINT, offset);
ctx->DrawPrimType(6 /* numPrims */);
```
← 122

GPU-ACCELERATED PATH RENDERING

TECHNICAL FIELD

This disclosure relates to graphics processing, and more particularly, to techniques for path rendering.

BACKGROUND

Path rendering may refer to the rendering of two-dimensional (2D) vector graphics paths (alternatively referred to herein as "paths"), each of which may include one or more path segments. When a path includes two or more path segments, the individual path segments may be of the same type or of different types. The types of path segments may include, for example, a line, an elliptic arc, a quadratic Bézier curve, and a cubic Bézier curve. In some examples, the path segment types may be defined in accordance with a standard vector graphics application programming interface (API), such as, e.g., the Open Vector Graphics (OpenVG) API.

Graphics processing units (GPUs) typically implement a three-dimensional (3D) graphics pipeline that is designed to be compliant with one or more 3D graphics APIs. Because the prevailing 3D graphics APIs in use today do not require that compliant devices support path rendering commands, modern GPUs often provide little to no hardware acceleration for path rendering commands. For example, a typical 3D graphics pipeline implemented in a modern GPU may include a rasterizer that is designed to rasterize low-order, non-curved, 3D graphics primitives (such as, e.g., points, lines and triangles), but is not capable of directly rendering curved primitives (such as, e.g., elliptic arcs and Bézier curves).

SUMMARY

In some examples, this disclosure describes a graphics processing unit (GPU) that includes hardware that improves the performance of hardware-accelerated path rendering in a 3D graphics pipeline. In other examples, the techniques of this disclosure include hardware and methods for implementing graphics application programming interface (API) functions that enable a GPU to process vertex buffers having a plurality of different path rendering primitive types. This disclosure also describes 3D graphics rendering pipeline hardware that supports vertex buffers capable of storing a plurality of different path rendering primitive types within a single buffer, as well as an additional primitive type buffer capable of storing values indicative of the primitive types of corresponding vertices of the vertex buffer. By supporting different type of primitives within a single vertex buffer, the techniques, methods, hardware, and devices of this disclosure may improve the performance of GPU-accelerated path-based rendering.

One example method of this disclosure (e.g., an API function call) may include a new type of draw call. The draw call receives as input a vertex buffer, which may include vertices of a plurality of different path-rendering primitive types. The draw call may also receive as input another buffer that indicates the primitive types corresponding to the vertices of the vertex buffer. The GPU pipeline may include modifications to various stages of the pipeline, such as the input assembler, the hull shader, and the domain shader to support processing different path-rendering primitive types from the vertex buffer.

In one example, this disclosure describes a method performed by a graphics processing unit (GPU) comprising receiving, by the GPU, a primitive type buffer comprising a plurality of primitive type entries, wherein each of a plurality of vertices of a vertex buffer of the GPU are associated with one or more of the plurality of primitive type entries, determining, by the GPU, primitives based on the plurality of vertices and the associated one or more primitive type entries, and rendering, by the GPU, the primitives based on the plurality of vertices and the associated one or more primitive type entries of the primitive type buffer.

In another example, this disclosure describes a graphics processing unit (GPU) comprising: a memory, and at least one processor. The at least one processor is configured receive a primitive type buffer comprising a plurality of primitive type entries, wherein each of a plurality of vertices of a vertex buffer of the GPU are associated with one or more of the plurality of primitive type entries. The at least one processor is further configured to determine primitives based on the plurality of vertices and the associated one or more primitive type entries, and render the primitives based on the plurality of vertices and the associated one or more primitive type entries of the primitive type buffer.

In another example, this disclosure describes a graphics processing unit (GPU) that includes means for receiving a primitive type buffer comprising a plurality of primitive type entries, wherein each of a plurality of vertices of a vertex buffer of the GPU are associated with one or more of the plurality of primitive type entries. The GPU further includes means for determining primitives based on the plurality of vertices and the associated one or more primitive type entries, and means for rendering the primitives based on the plurality of vertices and the associated one or more primitive type entries of the primitive type buffer.

In another examples, this disclosure describes a non-transitory computer-readable storage medium comprising instructions stored thereon that, when executed, cause at least one processor to receive a primitive type buffer comprising a plurality of primitive type entries, wherein each of a plurality of vertices of a vertex buffer of the GPU are associated with one or more of the plurality of primitive type entries. The non-transitory computer-readable storage medium further includes instructions that, when executed, cause the at least one processor to determine primitives based on the plurality of vertices and the associated one or more primitive type entries, and render the primitives based on the plurality of vertices and the associated one or more primitive type entries of the primitive type buffer.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIG. 6 is a diagram illustrating code of a graphics API that, when executed, may cause a GPU to execute one or more of the techniques of this disclosure.

DETAILED DESCRIPTION

Figure 1:
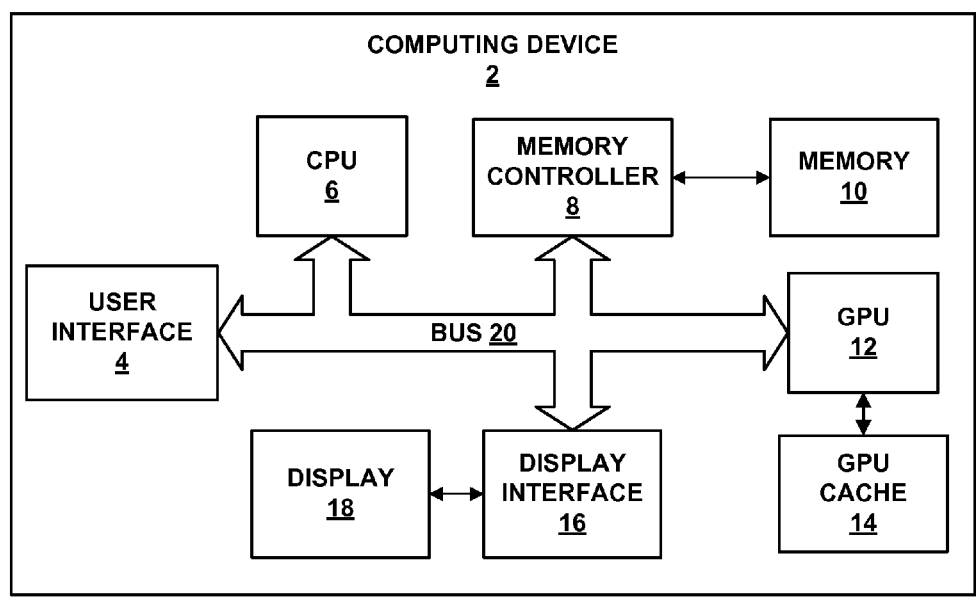
FIG. 1 is a block diagram illustrating an example computing device that may be used to implement the GPU-accelerated path rendering techniques of this disclosure.

This disclosure is directed to techniques for performing GPU-accelerated path rendering. Path rendering may refer to the rendering of two-dimensional (2D) vector graphics paths (alternatively referred to herein as "paths"), each of which may include one or more path segments. When a path includes two or more path segments, the individual path segments may be of the same type or of different types, also referred to as "primitive types." The primitive types of path segments may include, for example, a line, an elliptic arc, a quadratic Bézier curve, and a cubic Bézier curve, and the like. In some examples, the path segment types may be defined in accordance with a standard vector graphics application programming interface (API), such as, e.g., the Open Vector Graphics (OpenVG) API.

Graphics processing units (GPUs) may be configured to implement a three-dimensional (3D) graphics pipeline that is designed to be compliant with one or more 3D graphics APIs. Because the prevailing 3D graphics APIs in use today do not require that compliant devices (e.g., GPUs) support path rendering commands, modern GPUs often provide little to no hardware acceleration for path rendering commands. For example, a typical 3D graphics pipeline implemented in a modern GPU may include a rasterizer that is designed to rasterize low-order, non-curved, 3D graphics primitives (such as, e.g., points, lines and triangles), but may not be capable of directly rendering curved path rendering primitives (such as, e.g., elliptic arcs and Bézier curves).

One approach for path rendering may involve using a 3D GPU pipeline to provide partial GPU hardware acceleration for the execution of path rendering commands. This approach involves preprocessing a path segment with another processor (e.g., a central processing unit (CPU)) in order to convert the path segment into one or more low-order, non-curved, graphics primitives that can be rasterized by the GPU. In order to specify the graphics primitives, an application may call one or more functions of a graphics API, referred to as "draw calls."

A draw call may include, as an argument, a vertex buffer. The vertex buffer includes one or more vertices. The vertices of a vertex buffer specified in a draw call are generally limited to a single primitive type, and vertices associated with different primitive types must be specified in additional, subsequent draw calls. Because draw calls traditionally require the vertex buffer vertices to be of the same primitive type, a GPU may more easily determine to which primitive each of the vertices belong. For example, if the GPU determines that each quadratic Bézier curve ("quad") has three vertices, and that each of the vertices of a particular vertex buffer specified by a draw call belong to a quad, the GPU may infer that every third vertex marks the starts of a new quad primitive.

However, there is significant overhead associated with executing a different draw call corresponding to each of the primitive types to be rendered, for example, when performing path rendering. Each draw call requires the allocation of a separate vertex buffer, which requires processing time and memory to allocate. And in some examples, a CPU may allocate memory for the vertex buffer and transfer the vertex buffer data to the GPU. Each CPU-to-GPU transfer may results in large amounts of latency, which may reduce the performance of performing path-based rendering when executing draw calls corresponding to each of a plurality of different path rendering types.

In some examples, the GPU may be able to tessellate and render a path segment using a graphics architecture that is specified by a particular 3D graphics API, such as, e.g., Microsoft's DirectX 11 API. As described in more detail below, the techniques described in this disclosure describe possible modifications to the graphics hardware, and in particular the input assembler, hull shader, domain shader, and geometry shader stages, to perform path rendering. In this manner, the techniques described in this disclosure allow for graphics hardware of the DirectX 11 architecture to perform path rendering using a vertex buffer that includes vertices associated with multiple different primitive types.

Techniques in accordance with this disclosure allow a GPU to receive a vertex buffer of vertices corresponding to a plurality of different primitive types. When executing an application that performs graphics rendering, a CPU or another processing unit may allocate a buffer in system memory to store vertex data (i.e. vertices). The CPU may generate vertices data based on instructions of the executing application and store the vertices into memory allocated to the vertex buffer. Once a number of vertices have been stored to the vertex buffer by the CPU, the CPU may transfer the vertex buffer stored in system memory to the GPU. The GPU then receives and stores the vertices of the vertex buffer, e.g. in a memory of the GPU.

In order to support a single vertex buffer having vertices corresponding to different primitive types, the techniques of this disclosure include a new draw call. The new draw call includes as an argument to the call, a vertex buffer having vertices capable of being associated with multiple primitive types. The new draw also includes, as an argument, an additional primitive type buffer ("primtype buffer"). The values of the primtype buffer may comprise one or more primitive type entries that indicate primitive types with which one or more vertices of the vertex buffer are associated. Based on the values stored in the primtype buffer, the GPU may determine the primitive type associated with each of the vertex buffer vertices, and store a representation of each primitive that includes the vertices associated with each primitive.

Example techniques of this disclosure also include modifications to the graphics pipeline to support vertex buffer vertices of multiple different primitive types. The techniques of this disclosure include an input assembler that is capable of interpreting the vertex buffer and primtype buffer values, a hull shader stage that may generate control points for the multiple primitives based in part on primitive type state values received from the input assembler stage. The graphics pipeline of this disclosure also includes a tessellator stage that produces domain coordinates based on control points generated by the hull shader, and a domain shader that generates vertex data based on the domain coordinates generated by the tessellator and the primitive type state values received from the input assembler. The techniques of this disclosure further include a geometry shader stage that is configured to output 3D vertex coordinates based on the primitive state generated by the input assembler.

Path rendering may be divided into two main operations: (1) filling a path segment; and (2) stroking a path segment. In some examples, one or both of the filling and stroking operations may be performed to completely render a path. Conceptually, the filling operation may correspond to filling the interior region of a path segment with a specified fill color.

The stroking operation may conceptually correspond to "widening" the edges of a path segment using a straight-line pen held perpendicularly to the path. In addition to the main operations, path rendering may also involve applying various types of dashing, end caps to the ends of a path, applying various types of joins between the endpoints of interior path segments of a path, and handling cusps using re-tessellation.

A GPU may tessellate (e.g., divide) a primitive or a path segment using a tessellation stage, also referred to as a "tessellation unit" or a tessellator. After the GPU tessellates the path segment, the GPU may be configured to generate 3D geometry based on domain coordinates that the tessellator stage determines and outputs to subsequent stages in the GPU graphics rendering pipeline. The subsequent stages of the graphics pipeline may generate vertex coordinates based on the output of the tessellator stage.

FIG. 1 is a block diagram illustrating an example computing device 2 that may be used to implement the GPU-accelerated path rendering techniques of this disclosure. Computing device 2 may comprise a personal computer, a desktop computer, a laptop computer, a computer workstation, a tablet computing device, a video game platform or console, a wireless communication device (such as, e.g., a mobile telephone, a cellular telephone, a satellite telephone, and/or a mobile telephone handset), a landline telephone, an Internet telephone, a handheld device such as a portable video game device or a personal digital assistant (PDA), a personal music player, a video player, a display device, a television, a television set-top box, a server, an intermediate network device, a mainframe computer or any other type of device that processes and/or displays graphical data.

As illustrated in the example of FIG. 1, computing device 2 includes a user interface 4, a CPU 6, a memory controller 8, a memory 10, a graphics processing unit (GPU) 12, a GPU cache 14, a display interface 16, a display 18 and bus 20. User interface 4, CPU 6, memory controller 8, GPU 12 and display interface 16 may communicate with each other using bus 20. It should be noted that the specific configuration of buses and communication interfaces between the different components shown in FIG. 1 is merely exemplary, and other configurations of computing devices and/or other graphics processing systems with the same or different components may be used to implement the techniques of this disclosure.

CPU 6 may comprise a general-purpose or a special-purpose processor that controls operation of computing device 2. A user may provide input to computing device 2 to cause CPU 6 to execute one or more software applications. The software applications that execute on CPU 6 may include, for example, an operating system, a word processor application, an email application, a spreadsheet application, a media player application, a video game application, a graphical user interface application or another program. The user may provide input to computing device 2 via one or more input devices (not shown) such as a keyboard, a mouse, a microphone, a touch pad or another input device that is coupled to computing device 2 via user interface 4.

The software applications that execute on CPU 6 may include one or more graphics rendering instructions that instruct GPU 12 to cause the rendering of graphics data to display 18. In some examples, the software instructions may conform to a graphics application programming interface (API), such as, e.g., an Open Graphics Library (OpenGL®) API, an Open Graphics Library Embedded Systems (OpenGL ES) API, a Direct3D API, a DirectX API, a RenderMan API, a WebGL API, OpenVG® or any other public or proprietary standard graphics API. In order to process the graphics rendering instructions, CPU 6 may issue one or more graphics rendering commands to GPU 12 to cause GPU 12 to perform some or all of the rendering of the graphics data. In some examples, the graphics data to be rendered may include one or more vertex buffers. A vertex buffer is a list of graphics primitives, e.g., points, lines, triangles, quadrilaterals, triangle strips, patches, etc. In further examples, the vertex buffer graphics data to be rendered may include one or more path rendering primitives, such as, e.g., line segments, elliptic arcs, quadratic Bézier curves, and cubic Bézier curves.

Memory controller 8 facilitates the transfer of data going into and out of memory 10. For example, memory controller 8 may receive memory read requests and memory write requests from CPU 6 and/or GPU 12, and service such requests with respect to memory 10 in order to provide memory services for the components in computing device 2. Memory controller 8 is communicatively coupled to memory 10. Although memory controller 8 is illustrated in the example computing device 2 of FIG. 1 as being a processing module that is separate from each of CPU 6, GPU 12, and memory 10, in other examples, some or all of the functionality of memory controller 8 may be implemented on one or more of CPU 6, GPU 12, and memory 10.

Memory 10 may store program modules and/or instructions that are accessible for execution by CPU 6 and/or data for use by the programs executing on CPU 6. For example, memory 10 may store user applications and graphics data associated with the applications. Memory 10 may also store information for use by and/or generated by other components of computing device 2. For example, memory 10 may act as a device memory for GPU 12 and may store data to be operated on by GPU 12 as well as data resulting from operations performed by GPU 12. For example, memory 10 may store any combination of path data, path segment data, surfaces, texture buffers, depth buffers, stencil buffers, vertex buffers, frame buffers, or the like. In addition, memory 10 may store command streams for processing by GPU 12. For example, memory 10 may store path rendering commands, 3D graphics rendering commands, and/or general-purpose GPU (GPGPU) computing commands. Memory 10 may include one or more volatile or non-volatile memories or storage devices, such as, for example, random access memory (RAM), static RAM (SRAM), dynamic RAM (DRAM), synchronous dynamic random access memory (SDRAM), read-only memory (ROM), erasable programmable ROM (EPROM), electrically erasable programmable ROM (EEPROM), Flash memory, a magnetic data media or an optical storage media.

GPU 12 may be configured to execute commands that are issued to GPU 12 by CPU 6. The commands executed by GPU 12 may include graphics commands, draw call commands in accordance with the techniques of this disclosure, GPU state programming commands, memory transfer commands, general-purpose computing commands, kernel execution commands, tessellation commands, etc.

In some examples, GPU 12 may be configured to perform graphics operations to render one or more graphics primitives to display 18. In such examples, when one of the software applications executing on CPU 6 requires graphics processing, CPU 6 may provide graphics data to GPU 12 for rendering to display 18 and issue one or more graphics commands to GPU 12. The graphics commands may include, e.g., draw call commands, GPU state programming commands, conditional commands, memory transfer commands, blitting (block transfer or BLT) commands, tessellation commands, etc. The graphics data may include vertex data, texture data, surface data, etc. In some examples, CPU 6 may provide the commands and graphics data to GPU 12 by writing the commands and graphics data to memory 10, which may be accessed by GPU 12.

In accordance with the techniques of this disclosure, CPU 6 may provide graphics data to GPU 12 using a draw call. The draw call may receive a vertex buffer or a pointer to a vertex buffer that includes vertices of multiple different vertex types as an argument. The draw call may also receive a primtype buffer as an argument. The values (also referred to as entries) of the primtype buffer may indicate a corresponding primitive type associated with one or more vertices included in the vertex buffer. The draw call may also receive a pointer to the vertex buffer and the primtype buffer as arguments, in some examples. The vertex buffer and the primtype buffer are stored in memory 10.

CPU 6 may allocate a portion of memory 10 for the vertex and primtype buffers. CPU 6 may generate the vertex data for the vertex buffer, and transfer the vertices to the allocated portion of memory using bus 20, e.g. via a draw call. When a program causes CPU 6 to call the draw call, CPU 6 may cause memory controller 8 to transfer the vertex buffer and primtype buffer data to GPU 12 using bus 20. GPU 12 may store the vertex buffer and primtype buffer data in a memory of the GPU.

GPU 12 maybe built with a highly-parallel structure that provides more efficient processing of graphics operations than CPU 6. For example, GPU 12 may include a plurality of processing elements that are configured to operate on multiple vertices, control points, pixels and/or other data in a parallel manner. The highly parallel nature of GPU 12 may, in some instances, allow GPU 12 to render graphics images (e.g., GUIs and two-dimensional (2D) and/or three-dimensional (3D) graphics scenes) onto display 18 more quickly than rendering the images using CPU 6. In addition, the highly parallel nature of GPU 12 may allow GPU 12 to process certain types of vector and matrix operations for general-purposed computing applications more quickly than CPU 6.

In accordance with the techniques of this disclosure, as will be described in more detail below, GPU 12 may be configured to receive a single vertex buffer comprising vertices of different primitive types. As described above, GPU 12 may receive a vertex buffer of vertex buffers 40 from system memory 10 via a memory transfer initiated by CPU 6. GPU 12 may also be configured to receive a primtype buffer that indicates the primitive types of the vertex buffer vertices. As one example according to this disclosure, GPU 12 may be configured receive a primitive type buffer comprising a plurality of primitive type entries, wherein each of a plurality of vertices of a vertex buffer of GPU 12 are associated with one or more of the plurality of primitive type entries. GPU 12 may determine primitives based on the plurality of vertices and the associated one or more primitive type entries, and render the primitives based on the plurality of vertices and the associated one or more primitive type entries of the primitive type buffer.

GPU 12 may, in some examples, be integrated into a motherboard of computing device 2. In other instances, GPU 12 may be present on a graphics card that is installed in a port in the motherboard of computing device 2 or may be otherwise incorporated within a peripheral device configured to interoperate with computing device 2. In further instances, GPU 12 may be located on the same microchip as CPU 6 forming a system on a chip (SoC). GPU 12 may include one or more processors, such as one or more microprocessors, application specific integrated circuits (ASICs), field programmable gate arrays (FPGAs), digital signal processors (DSPs), or other equivalent integrated or discrete logic circuitry.

In some examples, GPU 12 may be directly coupled to GPU cache 14. Thus, GPU 12 may read data from and write data to GPU cache 14 without necessarily using bus 20. In other words, GPU 12 may process data locally using a local storage, instead of off-chip memory. This allows GPU 12 to operate in a more efficient manner by eliminating the need of GPU 12 to read and write data via bus 20, which may experience heavy bus traffic. In some instances, however, GPU 12 may not include a separate cache, but instead utilize memory 10 via bus 20. GPU cache 14 may include one or more volatile or non-volatile memories or storage devices, such as, e.g., random access memory (RAM), static RAM (SRAM), dynamic RAM (DRAM), erasable programmable ROM (EPROM), electrically erasable programmable ROM (EEPROM), Flash memory, a magnetic data media or an optical storage media.

CPU 6 and/or GPU 12 may store rendered image data in a frame buffer that is allocated within memory 10. The rendered image data may include rendered fill areas and stroke areas for a path segment to be rendered. Display interface 16 may retrieve the data from the frame buffer and configure display 18 to display the image represented by the rendered image data. In some examples, display interface 16 may include a digital-to-analog converter (DAC) that is configured to convert the digital values retrieved from the frame buffer into an analog signal consumable by display 18. In other examples, display interface 16 may pass the digital values directly to display 18 for processing.

Display 18 may include a monitor, a television, a projection device, a liquid crystal display (LCD), a plasma display panel, a light emitting diode (LED) array, a cathode ray tube (CRT) display, electronic paper, a surface-conduction electron-emitted display (SED), a laser television display, a nanocrystal display or another type of display unit. Display 18 may be integrated within computing device 2. For instance, display 18 may be a screen of a mobile telephone handset or a tablet computer. Alternatively, display 18 may be a stand-alone device coupled to computer device 2 via a wired or wireless communications link. For instance, display 18 may be a computer monitor or flat panel display connected to a personal computer via a cable or wireless link.

Bus 20 may be implemented using any combination of bus structures and bus protocols including first, second and third generation bus structures and protocols, shared bus structures and protocols, point-to-point bus structures and protocols, unidirectional bus structures and protocols, and bidirectional bus structures and protocols. Examples of different bus structures and protocols that may be used to implement bus 20 include, e.g., a HyperTransport bus, an InfiniBand bus, an Advanced Graphics Port (AGP) bus, a Peripheral Component Interconnect (PCI) bus, a PCI Express bus, an Advanced Microcontroller Bus Architecture (AMBA) Advanced High-performance Bus (AHB), an AMBA Advanced Peripheral Bus (APB), and an AMBA Advanced eXentisible Interface (AXI) bus. Other types of bus structures and protocols may also be used.

In some examples GPU 12 may determine domain coordinates for caps, and joins, and/or dashing patterns, and may divide a primitive into sub-segments. GPU 12 may also perform graphical operations based on the dashing pattern, such as keeping or dropping segments based on the pattern. A subsequent stage, such as a domain shader stage, may receive the domain coordinates as input and may determine vertex coordinates based on the domain coordinates.

As part of the stroking operation, and to generate one or more primitives (e.g., triangle primitives) that spatially correspond to a stroke area of a line segment, GPU 12 may receive a primitive, which may be defined by an equation, e.g., a parametric equation, etc. GPU 12 may divide the received primitive into one or more line segments utilizing the tessellation unit.

The path rendering techniques described in this disclosure may be implemented in any of the components of computing device 2 illustrated in FIG. 1 including, e.g., CPU 6, GPU 12, and memory 10. In some examples, all or almost all of the path rendering techniques may be implemented in GPU 12 (e.g., in a graphics pipeline of GPU 12). In additional examples, CPU 6 may implement techniques for configuring the state of the graphics pipeline and binding shader programs to the graphics pipeline to implement a path rendering pipeline in GPU 12 that performs the path rendering techniques of this disclosure. In further examples, CPU 6 may be configured to place data indicative of a path to be rendered into one or more buffers (e.g., one or more vertex buffers and primtype buffers) that may be accessed by GPU 12 to render one or more paths.

Figure 2:
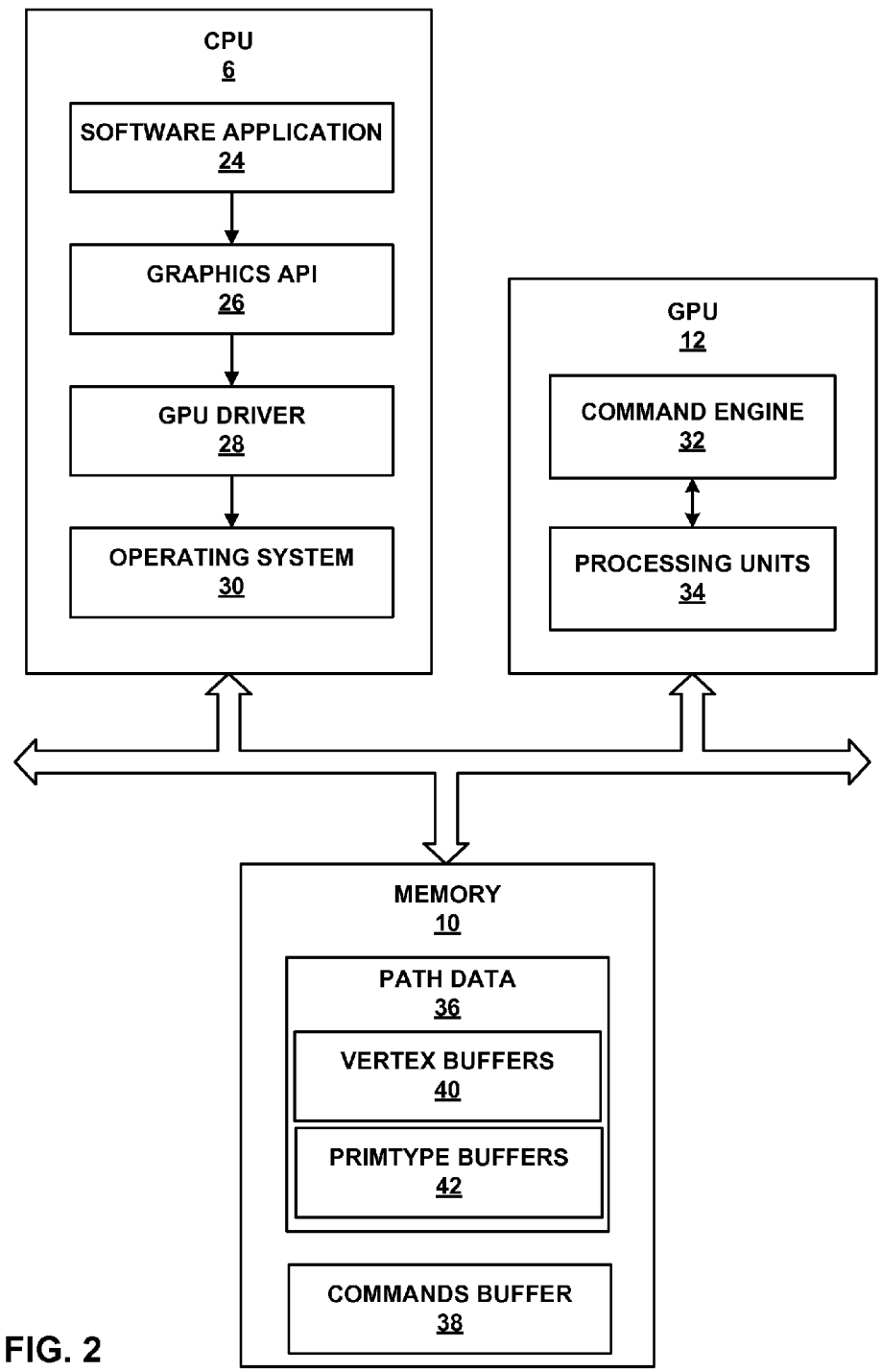
FIG. 2 is a block diagram illustrating the central processing unit (CPU), the graphics processing unit (GPU) and the memory of the computing device in FIG. 1 in further detail.

FIG. 2 is a block diagram illustrating CPU 6, GPU 12 and memory 10 of computing device 2 in FIG. 1 in further detail. As shown in FIG. 2, CPU 6 is communicatively coupled to GPU 12 and memory 10, and GPU 12 is communicatively coupled to CPU 6 and memory 10. GPU 12 may, in some examples, be integrated onto a motherboard with CPU 6. In additional examples, GPU 12 may be implemented on a graphics card that is installed in a port of a motherboard that includes CPU 6. In further examples, GPU 12 may be incorporated within a peripheral device that is configured to interoperate with CPU 6. In additional examples, GPU 12 may be located on the same microchip as CPU 6 forming a system on a chip (SoC).

CPU 6 is configured to execute software application 24, a graphics application processing interface (API) 26, a GPU driver 28 and an operating system 30. Software application 24 may include one or more instructions that cause graphics images to be displayed and/or one or more instructions that cause a non-graphics task (e.g., a general-purpose computing task) to be performed on GPU 12. Software application 24 may issue instructions to graphics API 26. Graphics API 26 may be a runtime service that translates the instructions received from software application 24 into a format that is consumable by GPU driver 28. GPU driver 28 receives the instructions from software application 24, via graphics API 26, and controls the operation of GPU 12 to service the instructions. For example, GPU driver 28 may formulate one or more commands 38, place the commands 38 into memory 10, and instruct GPU 12 to execute the commands 38. In some examples, GPU driver 28 may place the commands 38 into memory 10 and communicate with GPU 12 via operating system 30, e.g., via one or more system calls.

GPU 12 includes a command engine 32 and one or more processing units 34. In some examples, the one or more processing units 34 may form and/or implement a 3D graphics rendering pipeline, e.g., a DX 11 graphics rendering pipeline (i.e., a 3D graphics pipeline that is compliant with the DX 11 graphics API).

Command engine 32 is configured to receive commands from CPU 6 (e.g., via memory 10) and to cause GPU 12 to execute the commands. In response to receiving a state command, command engine 32 may be configured to set one or more state registers in GPU 12 to particular values based on the state command, and/or to configure one or more of the fixed-function processing units 34 based on the state command. In response to receiving a draw call command, command engine 32 may be configured to cause processing units 34 to render the geometry represented by the vertices in memory 10 based on data indicative of the type of path to be rendered, which may be contained in vertices of the vertex buffers 41 to be rendered, as well as data indicative of the primitive type of the vertex buffer vertices of primtype buffers 42. Command engine 32 may also receive shader program binding commands, and load particular shader programs into one or more of the programmable processing units 34 based on the shader program binding commands.

Processing units 34 may include one or more processing units, each of which may be a programmable processing unit or a fixed-function processing unit. A programmable processing unit may include, for example, a programmable shader unit that is configured to execute one or more shader programs that are downloaded onto GPU 12 from CPU 6. A shader program, in some examples, may be a compiled version of a program written in a high-level shading language, such as, e.g., an OpenGL Shading Language (GLSL), a High Level Shading Language (HLSL), a C for Graphics (Cg) shading language, etc. In some examples, a programmable shader unit may include a plurality of processing units that are configured to operate in parallel, e.g., an SIMD pipeline. A programmable shader unit may have a program memory that stores shader program instructions and an execution state register, e.g., a program counter register that indicates the current instruction in the program memory being executed or the next instruction to be fetched. The programmable shader units in processing units 34 may include, for example, vertex shader units, pixel shader units, geometry shader units, hull shader units, domain shader units, compute shader units, and/or unified shader units.

A fixed-function processing unit may include hardware that is hard-wired to perform certain functions. Although the fixed function hardware may be configurable, via one or more control signals for example, to perform different functions, the fixed function hardware typically does not include a program memory that is capable of receiving user-compiled programs. In some examples, the fixed function processing units in processing units 34 may include, for example, processing units that perform raster operations, such as, e.g., depth testing, scissors testing, alpha blending, etc., as well as Memory 10 may store path data 36 and one or more commands 38. In some examples, path data 36 may be stored as a plurality of vertices (or control points) in one or more of vertex buffers 41 allocated in memory 10. Path data 36 may also comprise one or more primtype buffers 42. Each of primtype buffers 42 includes data indicative of primtype types corresponding to one or more vertices of one of vertex buffers 41. In some examples, the path data may be stored in a patch list data structure (e.g., a four control point patch list). Commands 38 may be stored in one or more command buffers (e.g., a ring buffer). CPU 6 (e.g., GPU driver 28 via operating system 30) may place path data 36 and commands 38 into memory 10 for consumption by GPU 12. GPU 12

(e.g., command engine 32) may retrieve and execute commands 38 stored in memory 10.

In examples where path data 36 is stored as vertices, the vertices of vertex buffers 41 may include one or more attributes that geometrically define one or more primitives of a path to be rendered. For example, for a line, the vertices in the patch control list may include data indicative of coordinates for the endpoints of the line (e.g., (x0, y0) and (x1, y1)). For a cubic Bézier curve, the vertices in the patch control list may include data indicative of the coordinates of the four control points that define the curve (e.g., (x0, y0), (x1, y1), (x2, y2), (x3, y3)). For a quadratic Bézier curve, the vertices in the patch control list may include data indicative of coordinates for three control points instead of four control points. For elliptic arcs, the vertices in the patch control list may include data indicative of an endpoint parameterization of the elliptic arc or data indicative of a center parameterization of the elliptic arc.

Vertex buffers 41 may also include vertices of different primitive types within a single one of vertex buffers 41. For example, one of vertex buffers 41 may include two vertices that geometrically define a line (e.g., (x0, y0) and (x1, y1)), and three vertices that define a quadratic Bézier curve (e.g., (x2, y2), (x3, y3), and (x4, y4)). The vertex buffer that include vertices of the line and the quadratic Bézier curve may thus include values ((x0, y0), (x1, y1), (x2, y2), (x3, y3), and (x4, y4)). In some examples, vertices may be shared amongst two vertices. For example, (x1, y1) may be the endpoint of a first line that also includes (x0, y0), and the starting point of a second line, the endpoint of which is (x2, y2).

For each of vertex buffers 41, one of primtype buffers 42 includes data indicative of the primtype type of the one or more vertices of one of vertex buffers 41. Primtype buffers 42 may generally comprise constant integer values (e.g., 32-bit unsigned integer values) that indicate the primitive type of one or more vertices of one of vertex buffers 41. The values of primtype buffers 42 may be assigned or structured in a manner similar to "enum" types of the C programming language, as an example.

In the example of a vertex buffer that includes multiple path-rendering primitive types (i.e. a line and a quad bezier curve), the primtype buffer may include a constant value that indicates the first two coordinates pairs of the vertex buffer (i.e. (x0,y0), and (x1, y1) are of a line primitive type, and a second value that indicates the third, fourth, and fifth coordinate pairs (i.e., (x2, y2), (x3, y3), and (x4, y4)) are of the quad Bézier curve primitive type. Thus, in a simple example, the primtype buffer may include values (LINE, QUAD), where "LINE" and "QUAD" are constants corresponding to a line, and quad bezier curve primitive type, respectively.

In addition to constant values that indicate the primtiype types of one or more vertices, primtype buffers 42 may also include constant values that indicate whether the start and/or end of a primitive marks the beginning of a new subpath, as well as a constant value that indicates whether the first and last vertices of a primitive (also referred to as a subpath) are connected. The primtype buffer constant value that indicates the start of a new subpath is an open reset, denoted as "OR." The primtype value that indicates that the first and last vertices of a subpath are connected is referred to as a closed reset, denoted as "CR." In some examples, the different path types may correspond to a set of path types that are defined by the OpenVG API. The primtype values and subpaths are described in greater detail below with respect to FIG. 4.

Commands 38 may comprise one or more state commands and/or one or more draw call commands. A state command may instruct GPU 12 to change one or more of the state variables in GPU 12, such as, e.g., the draw color, the fill color, the stroke color, etc. In some examples, the state commands may include path rendering state commands that are configured to set one or more state variables associated with rendering a path. For example, the state commands may include a paint mode command that is configured to indicate whether a path to be rendered is to be filled, stroked, or both. As another example, the state commands may include a fill color command that specifies a color to be used for filling operations and/or a stroke color command that specifies a color to be used for stroking operations. As a further example, the state commands may specify one or more parameters for the stroke operation, such as, e.g., a stroke width, an end cap style (e.g., butt, round, square), a line join style (e.g., miter, round, bevel), a miter limit, etc. In some examples, in addition to or in lieu of using a state command to set one or more state parameters, one or more of the state parameters may be set by using a draw call command or by placing state indicators into a vertex buffer that contains path data 36.

A draw call command may instruct GPU 12 to render the geometry defined by a group of one or more vertices (e.g., defined in a vertex buffer) stored in memory 10. In some examples, the draw call command may invoke GPU 12 to render all of the vertices and primitives stored in a defined section (e.g., vertex buffers 41 of path data 36) of memory 10. In other words, once GPU 12 receives the draw call command, control is passed to GPU 12 for rendering the geometry and primitives represented by the vertices in the defined section (e.g., vertex buffer or path data 36) of memory 10. In accordance with the techniques of this disclosure, GPU 12 may receive a draw call command that includes a vertex buffer and a primtype buffer as arguments.

The draw call commands may include one or both of 3D draw call commands and path rendering draw call commands. For 3D rendering draw call commands, the geometry defined by the group of one or more vertices in the vertex buffer may correspond to one or more 3D graphics primitives to be rendered (e.g., points, lines, triangles, quadrilaterals, triangle strips, patches, etc.), and the 3D rendering draw call command may instruct GPU 12 to render the one or more 3D graphics primitives. For path rendering draw call commands, the geometry defined by the group of one or more vertices in the vertex buffer may correspond to one or more path primitives to be rendered (e.g., line segments, elliptic arcs, quadratic Bézier curves, and cubic Bézier curves, etc.), and the path rendering draw call command may instruct GPU 12 to render the one or more path primitives.

The draw call may also specify one or more tessellation commands, which utilize fixed function and programmable units that may include a hull shader, tessellator, and a domain shader. The hull shader may specify a domain that is to be tessellated. In some examples, a domain to be tessellated may comprise one of an isoline, triangle (tri), or quad (quadrilateral) domain. The tessellator operates on the specified domain, and outputs domain coordinates, based on which, the domain shader may determine vertex coordinates.

In some examples, the path rendering techniques described in this disclosure may be implemented in any of the components shown in FIG. 2 including, e.g., graphics API 26, GPU driver 28, command engine 32 and processing units 34. In some examples, all or almost all of the path rendering techniques may be implemented in a graphics pipeline in GPU 12 formed by processing units 34. For instance, the tessellation unit may be a unit of processing units 34. In additional examples, software application 24, graphics API 26 and/or GPU driver 28 of CPU 6 may implement techniques for configuring the state of the graphics pipeline and binding shader programs to the graphics pipeline to implement a path rendering pipeline in GPU 12 that performs the path rendering techniques of this disclosure. In further examples, software application 24, graphics API 26 and/or GPU driver 28 of CPU 6 may be configured to place data indicative of a path to be rendered into one or more buffers (e.g., one or more vertex buffers and primtype buffers) that may be accessed by GPU 12 to render one or more paths.

In accordance with the techniques of this disclosure, GPU 12 may be configured to receive a single vertex buffer comprising vertices of different primitive types. GPU 12 may also be configured to receive a primtype buffer that indicates the primitive types of the vertex buffer vertices. As one example according to this disclosure, GPU 12 may be configured receive a primitive type buffer comprising a plurality of primitive type entries, wherein each of a plurality of vertices of a vertex buffer of GPU 12 are associated with one or more of the plurality of primitive type entries. GPU 12 may determine primitives based on the plurality of vertices and the associated one or more primitive type entries, and render the primitives based on the plurality of vertices and the associated one or more primitive type entries of the primitive type buffer.

Figure 3:
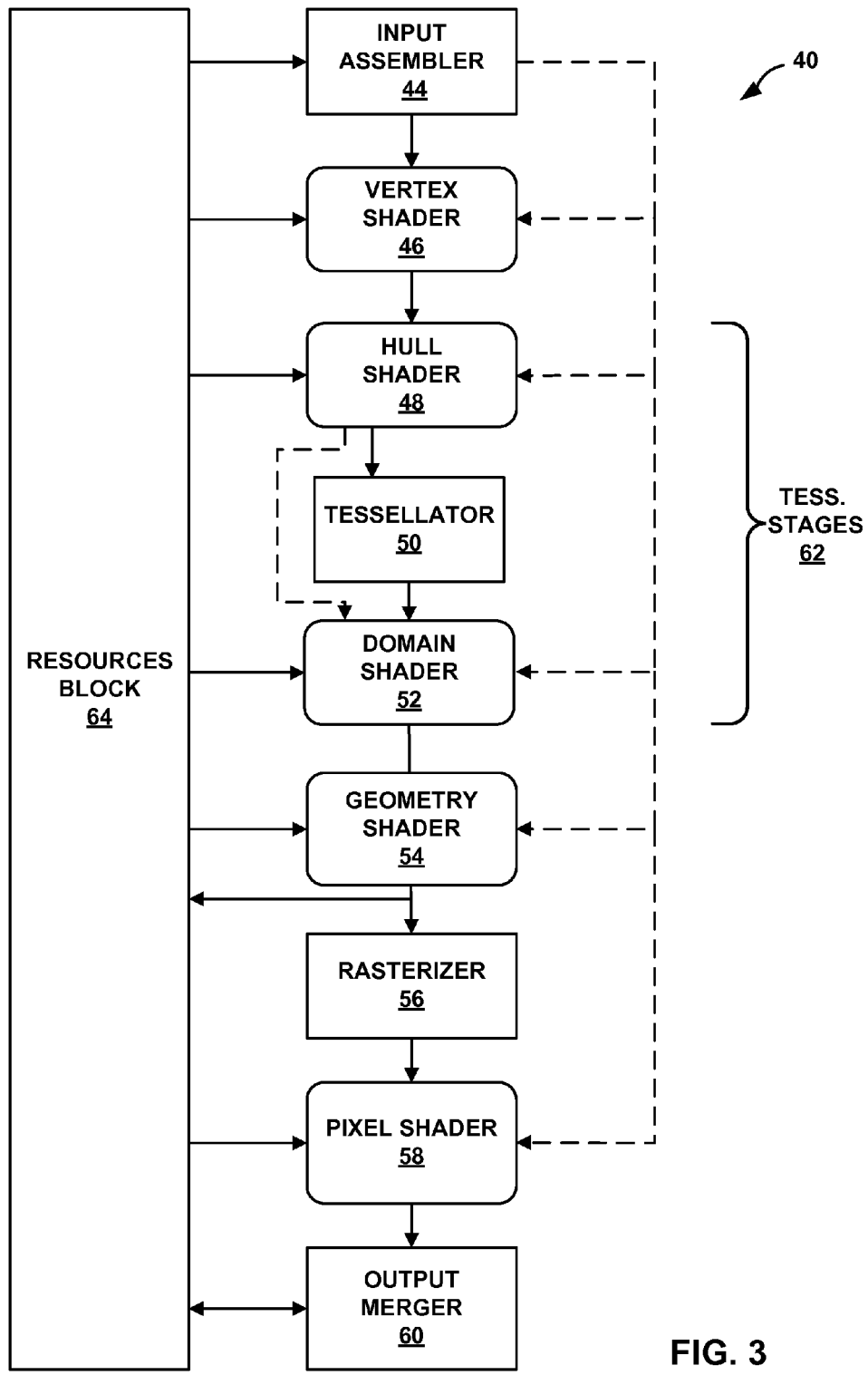
FIG. 3 is a conceptual diagram illustrating an example graphics pipeline that may perform the GPU-accelerated path rendering techniques of this disclosure.

FIG. 3 is a conceptual diagram illustrating an example graphics pipeline 40 that may perform the path rendering techniques of this disclosure. In some examples, the graphics pipeline may correspond to a Microsoft® DirectX (DX) 11 graphics pipeline. As shown in FIG. 3, graphics pipeline 40 includes a resources block 42 and a plurality of processing stages, which may comprise processing units 34 of FIG. 2. The plurality of processing stages (e.g. processing units 34) include an input assembler (IA) 44, a vertex shader (VS) 46, a hull shader (HS) 48, a tessellator 50, a domain shader (DS) 52, a geometry shader (GS) 54, a rasterizer 56, a pixel shader (PS) 58, and an output merger 60. Hull shader 48, tessellator 50, and domain shader 52 may form the tessellation stages 62 of graphics pipeline 40.

Resources block 42 may correspond to one or more memory resources used by graphics pipeline 40, such as, e.g., one or more textures and/or one or more buffers. Resources block 42 may store input data to be processed by one or more of the processing stages in graphics pipeline 40 and/or output data from one or more of the processing stages in graphics pipeline 40. As an example, resources block 42 may store a frame buffer that holds a rasterized version of a fill area for a path segment and/or a rasterized version of a stroke area for a path segment as described in this disclosure. In some examples, the memory resources that form resources block 42 may reside in memory 10 and/or GPU cache 14 of computing device 2.

The processing stages depicted in FIG. 3 with straight corners represent fixed-function processing stages, and the processing stages depicted in FIG. 3 with rounded corners represent programmable processing stages. For example, as shown in FIG. 3, input assembler 44, tessellator 50, rasterizer 56 and output merger 60 may be fixed-function processing stages, and vertex shader 46, hull shader 48, domain shader 52, geometry shader 54 and pixel shader 58 may be programmable processing stages. Each of the programmable stages may be configured to execute a shader program of a particular type. For example, vertex shader 46 may be configured to execute a vertex shader program, hull shader 48 may be configured to execute a hull shader program, etc. Each of the different types of shader programs may execute either on a common shader unit of the GPU or on one or more dedicated shader units that are dedicated to executing shader programs of one or more particular types.

As shown in FIG. 3, input assembler 44, vertex shader 46, hull shader 48, domain shader 52, geometry shader 54, pixel shader 58 and output merger 60 are communicatively coupled to resources block 42. Input assembler 44, vertex shader 46, hull shader 48, domain shader 52, geometry shader 54, pixel shader 58 and output merger 60 are configured to retrieve and/or to receive input data from resources block 42. Geometry shader 54 and output merger 60 are configured to write output data to resources block 42. The above-described configuration of communication between the processing stages in graphics pipeline 40 and resources block 42 is merely one example of how the communication may be configured between the processing stages of graphics pipeline 40 and resources block 42. In other examples, more or less uni-directional and/or bi-directional communication channels may be provided between the processing stages of graphics pipeline 40 and resources block 42.

Further information regarding the general operation of the DirectX 11 graphics pipeline may be found in Zink et al., "Practical Rendering & Computation with Direct3D 11," CRC Press (2011), the entire content of which is incorporated herein by reference.

As discussed above, the two main path rendering operations are: (1) filling a path segment; and (2) stroking a path segment. Solutions for performing stroking operations with graphics rendering pipeline 40 (e.g., the DirectX 11 graphics pipeline) will now be described.

In accordance with the techniques of this disclosure, CPU 6 may place vertices indicative of one or more primitives into a vertex buffer. CPU 6 may also place one or more primitive type values into a primtype buffer. In some examples, the vertex buffer may correspond to one of vertex buffers 41 of path data 36 shown in FIG. 2. The primitive topology for the vertices in the vertex buffer may be, in some examples, a patch control list. For a line, the vertices in the patch control list may include data indicative of coordinates for the endpoints of the line (e.g., (x0, y0) and (x1, y1)). For a cubic Bézier curve, the vertices in the patch control list may include data indicative of the coordinates of the four control points that define the curve (e.g., (x0, y0), (x1, y1), (x2, y2), (x3, y3)). For a quadratic Bézier curve, the vertices in the patch control list may include data indicative of coordinates for three control points that define the curve instead of four control points. For elliptic arcs, the vertices in the patch control list may include data indicative of an endpoint parameterization of the elliptic arc or data indicative of a center parameterization of the elliptic arc. The primtype buffer may include values corresponding to the primitive types associated with the vertices in the vertex buffer when the vertices in the vertex buffer are associated with primitives of different types. In some examples, CPU 6 may also place data indicative of the type of path to be rendered into an otherwise unused vertex attribute of the patch control list.

To perform the path stroking operation, input assembler 44 obtains path data 36 from memory 10, and passes the path data onto subsequent stages of graphics pipeline 40 to render the path segments (e.g., path primitives) specified by vertex buffers 41 and primtype buffers 42. For example, input assembler 44 may obtain a plurality of vertices from vertex buffers 42 stored in memory 10. Based on the entries of primitive data of primtype buffers 42, input assembler 44 may parse the vertices stored in the vertex buffer into individual primitives. Input assembler 44 may assign each individual primitive a primitive identifier ("primID,") and may store each primitive along with its associated primID in to a cache, such as a level 2 ("L2") cache for later reuse. The L2 cache may be part of resources block 64. In some examples, input assembler 44 may assign the primID values in a monotonically increasing or decreasing order.

In addition to storing each primitive, input assembler 44 may also generate primitive type state variables. The variables, denoted as "sv_curr_primtype," "sv_prev_primtype," and "sv_next_primtype," indicate the current, previous, and next primitive types relative to the primitive that is currently in the process of being rendered. Input assembler 44 passes the primitive type state variables to subsequent stages in the graphics pipeline, including domain shader stage 52, geometry shader stage, and hull shader 48.

Once input assembler 44 has generated the vertices, vertex shader 46 processes the generated vertices. In some examples, input assembler 44 may pass the vertices to be processed directly to vertex shader 46. In additional examples, input assembler 44 may direct vertex shader 46 to retrieve particular vertices for processing from one of vertex buffers 41 in resources block 64, e.g. based on the primID associated with the vertices.

Vertex shader 46 is configured to process vertices received from input assembler 44 and/or resources block 42 and to generate an output vertex for each input vertex processed by vertex shader 46. For example, for each input vertex, vertex shader 46 may execute an instance of a vertex shader program on a shader unit of GPU 12. The input vertices received by vertex shader 46 and the output vertices generated by vertex shader 46 may be alternatively referred to as input control points and output control points, respectively.

In further examples, vertex shader 46 may generate one or more output attributes for an output vertex that are not identical to the input attributes of a corresponding input vertex. For example, vertex shader 46 may perform substantive processing on one or more of the attributes of the input vertices to generate one or more attributes for the output vertices. As another example, vertex shader 46 may add and/or delete attributes from the set of input attributes to generate a set of output attributes for an output vertex.

Tessellation stages 62 (i.e., hull shader 48, tessellator 50, and domain shader 52) may tessellate the path segment defined by the input path data into a plurality of line segments. In some examples, tessellation stages 62 may receive a plurality of vertices that form a primitive, e.g., from vertex shader 46. In some examples, four vertices may comprise the primitive. Tessellation stages 62 may determine one or more domain coordinates based on the received primitive. The determined domain coordinates may approximate the curvature of the path to be rendered.

In general, hull shader 48 may pass the control points received from vertex shader 46 to domain shader 52 for further processing, and provide configuration data, such as a domain type, to tessellator 50. Hull shader 48 may also determine the control points based on the primitive state variables generated by input assembler 44 (i.e. sv_curr_primtype, sv_prev_primtype, and sv_next_primtype). Hull shader 48 may also generate one or more tessellation factors based on the primitive state variables, and pass the generated tessellation factors to tessellator 50.

Tessellator 50 may determine domain coordinates at which one or more parametric equations that represent a particular type of path segment or primitive should be evaluated. For the purposes of example, tessellator 50 is illustrated as one fixed function unit. Subsequent stages of graphics pipeline 40 may also utilize the domain coordinates determined by tessellator 50.

Domain shader 52 may evaluate the parametric equations at domain coordinates values determined by tessellator 50, and output a vertex for each evaluation. In some examples, each of the vertices output by domain shader 52 may include one or more attributes that are indicative of the position of the vertex. In additional examples, each of the vertices output by domain shader 52 may include one or more attributes that are indicative of the type of path rendering primitive associated with the vertex.

More specifically, hull shader 48 may process the control points received from vertex shader 46 and/or resources block 42 and may generate an output control for each instance of the hull shader program executed by hull shader 48. For example, for each output control point to be generated by hull shader 48, vertex shader 46 may execute an instance of a hull shader program on a shader unit of GPU 12.

In further examples, hull shader 48 may generate one or more output attributes for an output control point that are not identical to the input attributes of a respective one of the input control points. For example, hull shader 48 may perform substantive processing on one or more of the attributes of the input control points to generate one or more attributes for the output control points. As another example, hull shader 48 may add and/or delete attributes from a set of input attributes to generate the set of output attributes for an output vertex. In some examples, if GPU 12 receives path data for an elliptical arc that is in the form of an endpoint parameterization, hull shader 48 may convert the endpoint parameterization of the elliptical arc into a center parameterization for the elliptical arc as described in further detail below.

In further examples, hull shader 48 may drop primitives that are not to be rendered for a particular rendering operation. Dropping a primitive may refer to the process of causing data corresponding to the primitive to not be passed on to further stages of graphics pipeline, thereby effectively causing such a primitive to not be rendered by the remainder of the pipeline. For example, when graphics pipeline 40 is performing a filling operation, hull shader 48 may drop join primitives and cap primitives.

Hull shader 48 may also execute an instance of a patch constant function for each path segment. The patch constant function may determine and provide configuration parameters to tessellator 50 to be used by tessellator 50 when generating output values. In accordance with the techniques of this disclosure, the patch constant function may dependent partially on the primitive state variables, which hull shader 48 may receive from input assembler 44. For example, the patch constant function may cause hull shader 48 to provide tessellation factors to tessellator 50. The tessellation factors may specify a degree of tessellation that tessellator 50 is to apply to a particular tessellation domain (e.g., how finely the domain should be subdivided and/or the number of smaller objects into which the domain should be subdivided). In accordance with the techniques of this disclosure, hull shader 48 may take into account the primitive state variables when determining the tessellation factors provided to tessellator 50.

As another example, the patch constant function may cause hull shader 48 to provide a tessellation domain to tessellator 50. A tessellation domain may refer to an object that is used by tessellator 50 to generate a plurality of coordinates for use by tessellator 50. Conceptually, the tessellation domain may correspond to an object that is subdivided by tessellator 50 into a plurality of smaller objects. The positional coordinates of the vertices of the smaller objects are then sent to domain shader 52 for further processing. In some examples, the tessellation domain may be selected to be one of a quad, a tri, and an isoline. The smaller objects into which the domain is subdivided, in some examples, may correspond to triangles, line segments, or points. In some examples, hull shader 48 may specify an isoline tessellation domain and specify that tessellator 50 should subdivide the isoline domain into line segments.

In some examples, tessellator 50 may be configured to perform two-pass tessellation. In two-pass tessellation, hull shader 48 may receive input from geometry shader 54, for example from a streamout buffer (within GPU cache 14 or memory 10). In some examples, the input from geometry shader 54 may comprise primitive type data. Based on this input, hull shader 48 generates tessellation factors for tessellation unit 50 to be used in a second tessellation pass. This second pass receives tessellation factors generated by tessellator 50 in a first pass.

Tessellator 50 may generate a plurality of output values for each path segment processed by tessellation stages 62. The output values may determine the values at which one or more parametric equations that represent a particular type of path segment should be evaluated by domain shader 52. In some examples, tessellator 50 may generate the plurality of output values based on one or more tessellation factors and/or a tessellation domain provided to tessellator 50 by hull shader 48. For example, tessellator 50 may subdivide an isoline into a plurality of line segments, and generate an output value for each endpoint of the plurality of line segments in a normalized coordinate system. In accordance with the techniques of this disclosure, tessellator 50 may also generate primitive type data, and pass the primitive type data to geometry shader 54.

Domain shader 52 may receive domain coordinates and information indicative of one or more graphical features from tessellator 50 and the control points for a path segment, tessellation factors and a starting normal of the subsequent primitive, from hull shader 48. Domain shader 52 may also receive the primitive state values from input assembler 44. Based on these inputs, domain shader 52 generates output vertex coordinates, and endpoint normals that correspond to the vertex represented by the coordinates.

For example, for each output value received from tessellator 50, domain shader 52 may execute an instance of a domain shader program on a shader unit of GPU 12. The domain shader program may cause domain shader 52 to evaluate one or more parametric equations at a particular value that is determined based on the particular value received from tessellator 50, and to generate coordinates for an output vertex based on the evaluations, as well as the graphical feature associated with each vertex coordinate. One or more of the coefficients of the parametric equations used to generate the output vertex coordinates may be defined based on one or more of the control points received from hull shader 48. Each output vertex may correspond to an endpoint of one of the plurality of tessellated line segments. Two consecutive output vertices may correspond to the endpoints of a single tessellated line segment. In additional examples, the domain shader program may cause domain shader 52 to evaluate one or more additional parametric equations at a particular value that is determined based on the particular value received from tessellator 50 in order to generate normal coordinates for each output vertex.

Domain shader 52 may output the vertices in an ordered sequence where each set of adjacent vertices represents a tessellated line segment. The line segments may collectively approximate the path segment that was defined in the vertex buffer and the primtype buffer. For example, domain shader 52 may output the following set of vertices {0, 1, 2, 3, 4, 5} that define the following line segments: {0, 1}, {1, 2}, {2, 3}, {3, 4}, {4, 5}. In additional examples, domain shader 52 may output the following set of vertices {0, 1, 1, 2, 2, 3, 3, 4, 4, 5} that may define the same line segments as listed in the previous example.

In some examples, tessellator 50 and domain shader 52 may be configured to uniformly tessellate a path segment into a plurality of line segments according to the following technique. Specifically, tessellator 50 may output coordinates for parametric evaluation (e.g., t=0/T, 1/T, 2/T ... T/T, where T is the tessellation factor). Depending on the type of primitive, domain shader 52 may evaluate one or more parametric equations at the values that are output by tessellator 50.

For a line, T may, in some examples, be always equal to 1. In such examples, domain shader 52 may not necessarily need to perform any evaluation to generate vertices that correspond to the line path segment.

For a cubic Bézier curve, domain shader 52 may evaluate the curve and generate output vertices according to the following parametric equation:

$$V(t)=C0*(1-t)^3+C1*3*(1-t)^2*t+C2*3*(1-t)*t^2+C3*t^3 \quad (1)$$

where t corresponds to an output value provided by tessellator 50, V(t) corresponds to an output vertex that is generated for a particular output value (i.e., t), and C0, C1, C2, C3 correspond to the control points for the cubic Bézier curve.

Alternatively, for the cubic Bézier curve, domain shader 52 may evaluate the curve and generate output vertices according to the following parametric equations:

$$x(t)=X0*(1-t)^3+X1*3*(1-t)^2*t+X2*3*(1-t)*t^2+X3*t^3 \quad (2)$$

$$y(t)=Y0*(1-t)^3+Y1*3*(1-t)^2*t+Y2*3*(1-t)*t^2+Y3*t^3 \quad (3)$$

where t corresponds to an output value provided by tessellator 50, x(t) corresponds to the x-coordinate of an output vertex that is generated for a particular output value (i.e., t), y(t) corresponds to the y-coordinate of the output vertex that is generated for the particular output value (i.e., t), and (X0, Y0), (X1, Y1), (X2, Y2), (X3, Y3) correspond to the control points for the cubic Bézier curve.

For a quadratic Bézier curve, domain shader 52 may evaluate the curve and generate output vertices according to the following parametric equation:

$$V(t)=C0*(1-t)^2+C1*2*(1-t)*t+C2*t^2 \quad (4)$$

where t corresponds to an output value provided by tessellator 50, V(t) corresponds to an output vertex that is generated for a particular output value (i.e., t), and C0, C1, C2 correspond to the control points for the quadratic Bézier curve.

Alternatively, for the quadratic Bézier curve, domain shader 52 may evaluate the curve and generate output vertices according to the following parametric equations:

$$x(t)=X0*(1-t)^2+X1*(1-t)*t+X2*t^2 \quad (5)$$

$$y(t)=Y0*(1-t)^2+Y1*(1-t)*t+Y2*t^2 \quad (6)$$

where t corresponds to an output value provided by tessellator 50, x(t) corresponds to the x-coordinate of an output vertex that is generated for a particular output value (i.e., t), y(t) corresponds to the y-coordinate of the output vertex that is generated for the particular output value (i.e., t), and (X0, Y0), (X1, Y1), (X2, Y2) correspond to control points for the quadratic Bézier curve.

For an elliptic arc path segment, domain shader 52 may evaluate the curve and generate output vertices according to the following parametric equations:

$$x = \text{Center}_x + rh\, \text{Cos}*\cos(\text{angle}_t) - rv\, \text{Sin}*\sin(\text{angle}_t) \quad (7)$$

$$y = \text{Center}_y + rh\, \text{Sin}*\cos(\text{angle}_t) + rv\, \text{Cos}*\sin(\text{angle}_t) \quad (8)$$

where the parameterization angle $\text{angle}_t$ is determined from tessellator output t, x corresponds to the x-coordinate of an output vertex that is generated for a particular parameterization angle (i.e., $\text{angle}_t$), y corresponds to the y-coordinate of the output vertex that is generated for the parameterization angle (i.e., $\text{angle}_t$), rh represents the horizontal radius of the unrotated ellipse, ry represents the vertical radius of the unrotated ellipse, rv Cos, rv Sin, rh Cos and rh Sin represent ry*Cos(angle), ry*Sin(angle), rh*Cos(angle) and rh*Sin(angle), respectively, and angle represents the counter-clockwise angle of the ellipse relative to the x axis measured prior to scaling by (rh, rv). In some examples, hull shader 48 may be configured to determine (e.g., precompute) cos(angle) and sin(angle) and/or to determine (e.g., precompute) the rv Cos, rv Sin, rh Cos and rh Sin values, and to provide these values to domain shader 52 for use in evaluating the above-recited parametric equations for elliptic arcs.

As discussed above with respect to elliptic arcs, the vertices in the patch control list, in some examples, may include data indicative of an endpoint parameterization for the elliptic arc. In such examples, hull shader 48 (e.g., a hull shader program executing on a shader unit of GPU 12) may be used to convert the data indicative of an endpoint parameterization of the elliptic arc to data indicative of a center parameterization of the elliptic arc.

An example technique for finding the correct center of an ellipse when converting an endpoint parameterization of an elliptic arc to a center parameterization of the elliptic arc is now described. The example technique may determine a center point (cx, cy) and the initial and final angles θ1 and θ2 of an ellipse and/or elliptic arc based on an endpoint representation of an ellipse defined by the set of parameters (x0, y0), (x1, y1), rh, rv, φ, $f_S$, and $f_A$. An ellipse with center point (cx, cy), radii rh and rv, and rotation angle rot may satisfy the implicit equation $(x')^2 + (y')^2 = 1$, where x'=((x−cx)*cos(rot)+(y−cy)*sin(rot))/rh and y'=(−(x−cx)*sin(rot)+(y−cy)*cos(rot))/rv. The transformation from (x, y) to (x', y') maps the desired ellipse into a unit circle centered at the origin.

To determine the center points of the pair of ellipses with common radii and rotation angle that pass through the two given points $(x_0, y_0)$ and $(x_1, y_1)$, a plane is first transformed into a suitably scaled and rotated coordinate system such that the equation of each ellipse becomes $(x'-cx)^2 + (y'-cy)^2 = 1$. Then the centers (i.e., ($cx_0'$, $cy_0'$) and ($cx_1'$, $cy_1'$)) of the two unit circles whose circumferences pass through two given points may be found. Finally, the center points are placed through an inverse transformation to obtain solutions in the original coordinate system.

The center points of the two unit circles that pass through points $(x_0, y_0)$ and $(x_1, y_1)$ are given by $(x_m \pm \Delta y*d, y_m \mp \Delta x*d)$, where $x_m=(x_0+x_1)/2$, $y_m=(y_0+y_1)/2$, $\Delta x=(x_0-x_1)$, $\Delta y=(y_0-y_1)$, and $d=\sqrt{1/(\Delta x^2+\Delta y^2) - 1/4}$. If d is infinite or imaginary, no solution exists due to the input points being coincident or too far apart, respectively. The angles θ1 and θ2 may be found by finding the slope of the endpoints on the circle and computing arctangents.

The following pseudo-code illustrates the process of computing ellipse centers according to the above-described technique. The findUnitCircles function is called by findEllipses following inverse transformation of the original ellipse parameters.

```
/* Given: Points (x0, y0) and (x1, y1)
* Return: TRUE if a solution exists, FALSE otherwise
* Circle centers are written to (cx0, cy0) and (cx1, cy1)
*/
static VGboolean findUnitCircles(double x0, double y0,
            double x1, double y1,
            double *cx0, double *cy0,
            double *cx1, double *cy1)
{
    /* Compute differences and averages */
    double dx = x0 - x1;
    double dy = y0 - y1;
    double xm = (x0 + x1)/2;
    double ym = (y0 + y1)/2;
    double dsq, disc, s, sdx, sdy;
    /* Solve for intersecting unit circles */
    dsq = dx*dx + dy*dy;
    if (dsq == 0.0) return VG_FALSE; /* Points are coincident
*/
    disc = 1.0/dsq - 1.0/4.0;
    if (disc < 0.0) return VG_FALSE; /* Points are too far
apart */
    s = sqrt(disc);
    sdx = s*dx;
    sdy = s*dy;
    *cx0 = xm + sdy;
    *cy0 = ym - sdx;
    *cx1 = xm - sdy;
    *cy1 = ym + sdx;
    return VG_TRUE;
}
/* Given: Ellipse parameters rh, rv, rot (in degrees),
* endpoints (x0, y0) and (x1, y1)
* Return: TRUE if a solution exists, FALSE otherwise
* Ellipse centers are written to (cx0, cy0) and (cx1, cy1)
*/
VGboolean findEllipses(double rh, double rv, double rot,
        double x0, double y0, double x1, double
y1,
        double *cx0, double *cy0, double *cx1,
double *cy1)
{
    double COS, SIN, x0p, y0p, x1p, y1p, pcx0, pcy0, pcx1,
pcy1;
    /* Convert rotation angle from degrees to radians */
    rot *= M_ PI/180.0;
    /* Pre-compute rotation matrix entries */
    COS = cos(rot); SIN = sin(rot);
    /* Transform (x0, y0) and (x1, y1) into unit space */
    /* using (inverse) rotate, followed by (inverse) scale */
    x0p = (x0*COS + y0*SIN)/rh;
    y0p = (-x0*SIN + y0*COS)/rv;
    x1p = (x1*COS + y1*SIN)/rh;
    y1p = (-x1*SIN + y1*COS)/rv;
    if (!findUnitCircles(x0p, y0p, x1p, y1p,
        &pcx0, &pcy0, &pcx1, &pcy1)) {
        return VG_FALSE;
    }
    /* Transform back to original coordinate space */
    /* using (forward) scale followed by (forward) rotate */
    pcx0 *= rh; pcy0 *= rv;
    pcx1 *= rh; pcy1 *= rv;
    *cx0 = pcx0*COS - pcy0*SIN;
    *cy0 = pcx0*SIN + pcy0*COS;
    *cx1 = pcx1*COS - pcy1*SIN;
    *cy1 = pcx1*SIN + pcy1*COS;
    return VG _TRUE;
}
```

Further details regarding converting an endpoint parameterization of an elliptic arc to a center parameterization of the elliptic arc may be found in the "OpenVG Specification, Version 1.1," Section 18.4, Dec. 3, 2008, available at: http://www.khronos.org/registry/vg/specs/openvg-1.1.pdf, the entire content of which is incorporated herein by reference.

Geometry shader 54 may receive tessellated line segments from domain shader 52 and generate a plurality of triangle primitives based on the tessellated line segments. In accordance with the techniques of this disclosure, geometry shader 54 may also generate the triangle primitives based on primitive type data received from tessellator 50. For example, for each of the tessellated line segments, geometry shader 54 may execute an instance of a geometry shader program on a shader unit of GPU 12, and generate a triangle primitive for the tessellated line segment based on the respective tessellated line segment. In some examples, for each of the tessellated line segments, geometry shader 54 may receive two vertices from domain shader 52 that correspond to the respective tessellated line segment, and generate a set of three vertices that correspond to a triangle primitive.

In some examples, two of the vertices of the triangle primitive may be the same vertices (e.g., have the same positional coordinates) as the two received vertices. In such examples, geometry shader 54 may generate the third vertex based on a common vertex that is common for all tessellated line segments associated with a path segment to be rendered. The common vertex may or may not correspond to one of the endpoints of the tessellated line segments. In some examples, the common vertex may correspond to the first vertex in a set of vertices that correspond to the tessellated line segments for a path segment to be rendered.

Geometry shader 54 may be invoked once for each of the tessellated line segments produced by domain shader 52. For each of the tessellated line segments, geometry shader 54 may generate a triangle primitive using a common control point as a first vertex of the triangle and using the two endpoints of the respective tessellated line segment as the second and third vertices of the triangle. For example, an example was provided above where domain shader 52 generated the following set of vertices {0, 1, 2, 3, 4, 5} that define the following line segments: {0, 1}, {1, 2}, {2, 3}, {3, 4}, {4, 5}. For the above-listed sequence of line segments, geometry shader 54 may generate the following triangles: {C, 0, 1}, {C, 1, 2}, {C, 2, 3}, {C, 3, 4}, {C, 4, 5}, {C, 4, 5} where C is any single vertex that is common to all of the triangles.

In some examples, geometry shader 54 may also be configured to "stream out" output data back to resources block 42. Graphics pipeline 40 may transmit the streamed out data back to hull shader 48, and domain shader 52 in some examples, in order to perform a second tessellation pass.

Rasterizer 56 may be configured to convert a plurality of 3D graphics primitives (e.g., points, lines, and triangles) into a plurality of pixels that correspond to the 3D graphics primitives. For example, rasterizer 56 may receive three vertices that correspond to a triangle primitive, and convert the three vertices into a plurality of pixels that correspond to the screen pixel locations that are covered by the triangle primitive. Screen pixel locations that are covered by the triangle primitive may include screen pixel locations that correspond to the vertices of the triangle, the edges of the triangle, and the interior of the triangle.

Pixel shader 58 may receive pixels from rasterizer 56, and generate shaded pixels based on the received pixels according to a pixel shader program. For example, for each pixel received from rasterizer 56, pixel shader 58 may execute an instance of a pixel shader program on a shader unit of GPU 12.

In further examples, pixel shader 58 may generate one or more output attributes for an output pixel that are not identical to the input attributes of a respective one of the input pixels. For example, pixel shader 58 may perform substantive processing on one or more of the attributes of an input pixel to generate one or more attributes for an output pixel. As another example, pixel shader 58 may add and/or delete attributes from a set of input attributes to generate the set of output attributes for an output pixel.

Output merger 60 may place pixel data received from pixel shader 58 into a render target (e.g., a frame buffer or a stencil buffer). In some examples, output merger 60 may merge the pixel data received from pixel shader 58 with the pixel data already stored in a render target based on a raster operation.

In addition to domain shader 52 evaluating parametric equations to generate positional coordinates for vertices, domain shader 52 may also generate normals, e.g., tangents, for the vertices during the stroking operation. To generate the normals, domain shader 52 may evaluate additional parametric equations for each of the values generated by tessellator 50, and output one or more normals for each evaluation. In some cases, the normals may be output as attributes of a vertex that is output by domain shader 52. For example, for the stroking operation, an output vertex produced by domain shader 52 may include one or more attributes that are indicative of the position of the vertex, one or more attributes that are indicative of a normal or tangent associated with the vertex.

To generate the normals for curved path segments (e.g., Bézier curves and elliptic arcs), the tangent formulae for the curved path segments may be used. In general, the tangent formulae for curves and elliptic arcs (which may be used to determine the normals) are the derivatives of the parametric formulas described above with respect to generating the vertices for the curves and arcs.

For example, for a cubic Bézier curve, domain shader 52 may generate normals for the output vertices of the curve according to the following parametric equation:

$$N(t) = C0 * -3*(1-t)^2 + C1*(-6*(1-t)*t + 3*(1-t)^2) + C2*(-3*t^2 + 6*(1-t)*t) + C3*3*t^2 \quad (9)$$

where t corresponds to an output value provided by tessellator 50, N(t) corresponds to an output normal that is generated for a particular output value (i.e., t), and C0, C1, C2, C3 correspond to the control points for the cubic Bézier curve. A derivative of the parametric equation for the quadratic Bézier curve provided above may be used to generate normals for a quadratic Bézier curve in a similar fashion.

Alternatively, for the cubic Bézier curve, domain shader 52 may generate normals for the output vertices of the curve according to the following parametric equations:

$$x(t) = X0*-3*(1-t)^2 + X1*(-6*(1-t)*t + 3*(1-t)^2) + X2*(-3*t^2 + 6*(1-t)*t) + X3*3*t^2 \quad (10)$$

$$y(t) = Y0*-3*(1-t)^2 + Y1*(-6*(1-t)*t + 3*(1-t)^2) + Y2*(-3*t^2 + 6*(1-t)*t) + Y3*3*t2 \quad (11)$$

where t corresponds to an output value provided by tessellator 50, x(t) corresponds to the x-coordinate of an output normal that is generated for a particular output value (i.e., t), y(t) corresponds to the y-coordinate of the output normal that is generated for the particular output value (i.e., t), and (X0, Y0), (X1, Y1), (X2, Y2), (X3, Y3) correspond to the control points for the cubic Bézier curve. A derivative of the parametric equations for the quadratic Bézier curve provided above may be used to generate normals for a quadratic Bézier curve in a similar fashion.

For an elliptic arc path segment, domain shader 52 may generate normals for the output vertices of the curve according to the following parametric equations:

$$\text{Tan}_x = -rh\ \text{Cos}*\sin(\text{angle}_t) - rv\ \text{Sin}*\cos(\text{angle}_t) \quad (12)$$

$$\text{Tan}_y = -rh\ \text{Sin}*\sin(\text{angle}_t) + rv\ \text{Cos}*\cos(\text{angle}_t) \quad (13)$$

where the parameterization angle, $\text{angle}_t$, is determined from tessellator output (i.e., t), $\text{Tan}_x$ corresponds to the x-coordinate of an output normal that is generated for a particular parameterization angle (i.e., $\text{angle}_t$), $\text{Tan}_y$ corresponds to the y-coordinate of the output normal that is generated for the parameterization angle (i.e., $\text{angle}_t$), rh represents the horizontal radius of the unrotated ellipse, ry represents the vertical radius of the unrotated ellipse, rv Cos, rv Sin, rh Cos and rh Sin represent rv*Cos(angle), rv*Sin(angle), rh*Cos(angle) and rh*Sin(angle), respectively, and angle represents the counter-clockwise angle of the ellipse relative to the x axis, measured prior to scaling by (rh, rv). In some examples, hull shader 48 may be configured to determine (e.g., precompute) cos(angle) and sin(angle) and/or to determine (e.g., precompute) the rv Cos, rv Sin, rh Cos and rh Sin values, and to provide these values to domain shader 52 for use in evaluating the above-recited parametric equations for ellipses.

After finding the tangent, the normal vector may be found according to the following equation:

$$\text{normal} = \text{normalize}(-\text{Tan}_y, \text{Tan}_x) \quad (14)$$

where normal corresponds to a normalized vector for the $(\text{Tan}_x, \text{Tan}_y)$ vector, and normalize(x,y) is a function that generates a normalized version of an input vector (x,y). A normalized version of the vector (x,y) may refer to a vector that has the same direction as vector (x,y) and a length (e.g., norm) of one.

As discussed above with respect to elliptic arcs, the vertices in the patch control list may, in some examples, include data indicative of an endpoint parameterization. In such examples, hull shader 48 may convert the data indicative of an endpoint parameterization of the elliptic arc to data indicative of a center parameterization of the elliptic arc.

Thus, in accordance with the techniques of this disclosure, one or more stage of graphics pipeline 40 may be configured to receive a primitive type buffer comprising a plurality of primitive type entries, wherein each of a plurality of vertices of a vertex buffer of GPU 12 are associated with one or more of the plurality of primitive type entries. Graphics pipeline 40 may be further configured to determine primitives based on the plurality of vertices and the associated one or more primitive type entries, and render the primitives based on the plurality of vertices and the associated one or more primitive type entries of the primitive type buffer.

Figure 4:
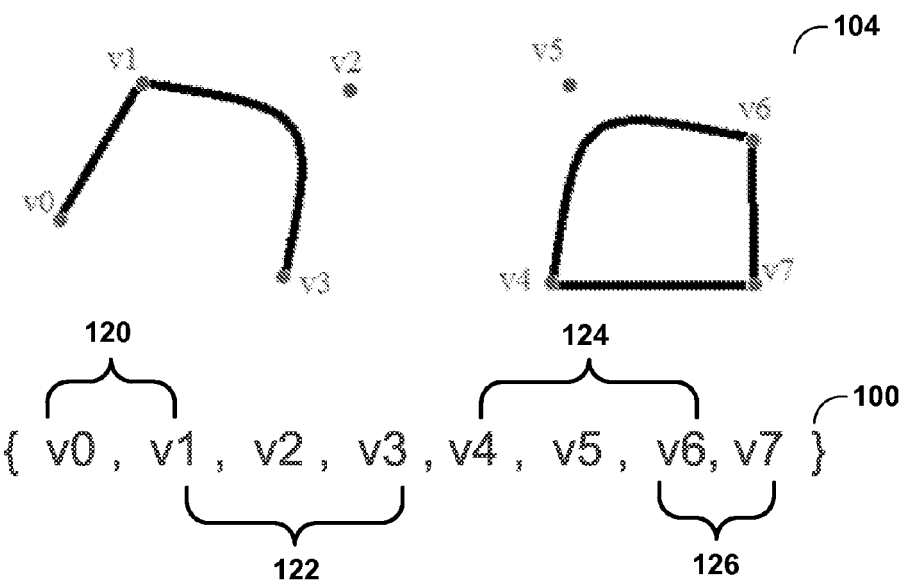
FIG. 4 is a conceptual diagram illustrating buffers of a GPU in accordance with the GPU-accelerated path rendering techniques of this disclosure.

FIG. 4 is a conceptual diagram illustrating buffers of a GPU in accordance with the GPU-accelerated path rendering techniques of this disclosure. The example of FIG. 4 includes a sample vertex buffer 100, a primtype buffer 102, and a corresponding output 104. In the example of FIG. 4, vertex buffer 100 includes eight vertices, denoted as v0-v7. Each of vertices v0-v7 comprises a vertex of a path-rendering primitive. Input assembler 44 and in some cases, other stages of GPU 12, determines a primitive type associated with each of vertices v0-v7 based on the values of primtype buffer 102.

In the example of FIG. 4, primtype buffer 102 begins with an OR value 106, indicating an open reset. An open reset indicates the beginning of a new subpath, which is a set of path-rendering primitives that are connected. More particularly, the last vertex of each path-rendering primitive of the subpath is connected with the first vertex of the subsequent vertex in the subpath. Depending upon whether the next subpath begins with an OR or a closed reset (CR), GPU 12 may connect the first vertex of the subpath with the last vertex of the subpath. The end of each subpath, and the beginning of a new subpath is also indicated by a subsequent reset value.

Following an open or closed reset value that indicates the beginning of a subpath, and before a reset value that indicates the end of the subpath, are one or more primtype buffer values that indicate the path-rendering primitive types. Each primitive type value indicates the primitive type of one or more vertices comprising one of the primitives that make up the subpath. Input assembler 44 of GPU 12 determines the vertices that comprise each primitive of the subpath, generates a primitive based on each of the primitive type values subsequent to the reset beginning the primitive, and stores a representation of each generated primitive in resources block 64.

To determine the number of subpaths associated with the vertices of vertex buffer 100, input assembler 44 may scan the primtype values of primtype buffer 102 to determine the indices of any open or closed reset values. In the example of FIG. 4, input assembler 44 determines that primtype buffer 102 includes two subpaths. The start of the first subpath is indicated by open reset 106, and the end of the first subpath is indicated by closed reset (CR) 112. CR 112 also indicates the start of the second subpath. In the example of FIG. 4, the second, last subpath does not include a reset to denote the end of the subpath. If the last subpath does not include a reset, input assembler 44 infers that the end reset of the last subpath is a closed reset.

For each subpath, input assembler 44 first reads the start reset. In the case of the first subpath, the start reset is OR 106. After reading the start reset of the subpath, input assembler 44 reads each primitive type value of primtype buffer 102, up until and including the end reset of the subpath. In this example, the primitive types of the first subpath include LINE primitive type 108, and QUAD primitive type 110, and the end reset is CR 112. Based on these primitive types, which input assembler 44 reads from primtype buffer 102, input assembler 44 determines that a line primitive and a quadratic curve primitive comprise the primitives of the first subpath.

Input assembler then groups the vertices of vertex buffer 100 into representations of each primitive. To group the vertices of vertex buffer 100 into primitives, input assembler 44 determines the number of vertices associated with each primitive type of the subpath, and based on the number of vertices associated with each path-rendering primitive type, further determines the vertices of vertex buffer 100 associated with each primitive. In the example of FIG. 4, the first primitive type value after starting OR 106 is LINE primitive type value 108, which corresponds to a line path-rendering primitive type. Input assembler 44 determines that two vertices of vertex buffer 100 are associated with a line, because by definition, a line is comprised of two vertices. Based on line primitive type 108, input assembler 44 determines that the first two vertices 106, and 108 respectively, of vertex buffer 100 are associated with a line primitive.

Once input assembler 44 has determined the vertices of each primitive, in this case the line primitive, input assembler 44 stores a representation of the primitive, including the vertices (vertices v0 and v1 in this example) in resources block 64. In some examples, input assembler 44 may generate a primID and associated the primitive ID with the representation of the primitive. Input assembler 44 or other stages of GPU 12 may utilize the primID as an index by which to access the primitive data (e.g., the vertices associated with the primitive) from resources block 64.

Input assembler then continues the process of determining a primitive type, and vertices for each primitive of each subpath. In the example of FIG. 4, input assembler 44 reads that the next primitive type is QUAD primitive type, indicating that the next primitive type of the subpath is a quadratic curve, which by definition has three points. In the absence of a reset value, input assembler 44 determines that the vertex of the last primitive (vertex v1 in this case) is the first vertex of the current primitive of the subpath. Thus, input assembler 44 determines that the quadratic curve is associated with vertices v1, v2, and v3 (vertices 122). Input assembler 44 generates a primID for the quadratic curve primitive, and stores the primitive in resources block 64.

Input assembler then reads the next value of primtype buffer 102, CR 112, which indicates the end of the first subpath and the beginning of a second subpath. If the value of the ending reset of a subpath indicates that first and last vertices of the subpath are connected, input assembler 44 may generate and store additional primitive data corresponding to a line primitive that connects the first and last vertices of the subpath. In the example of the first subpath, the ending reset, CR 112 indicates that the first vertex of the first subpath and the last vertex of the subpath are not connected.

After reading an end reset, which also indicates the start of a new subpath, input assembler 44 then moves on to generating the primitives of the second subpath, the start of which is indicated by CR 112. After reading CR 112, which indicates the start of the second subpath, input assembler 44 reads QUAD primitive type value 114, which indicates that the first primitive of the second subpath is a quadratic curve having three vertices. Because CR 112 indicates the start of a new subpath, input assembler 44 determines that the first vertex of the second subpath is the vertex after the last vertex of the previous (first) subpath, in this case v4. After determining that the first primitive of the second subpath is a quadratic curve, input assembler 44 determines that vertices v4, v5, and v6 (vertices 124) are part of the primitive, generates a representation of the quadratic curve primitive and a primID for the quadratic primitive, and stores the primID and the primitive representation in resources block 64.

Input assembler then reads the next value of primtype buffer 102, i.e. LINE primitive type value 116. Input assembler determines that the second primitive of the second primitive is a line primitive having two vertices. Input assembler 44 reads the last vertex of the previous primitive, vertex v6, and the next vertex, v7 (vertices 126). Input assembler 44 then generates a primID for the primitive, and stores a representation of the primitive data, including vertices v6 and v7, as well as the primID in resources block 64.

Because there are no more primitive type values in primtype buffer 102, input assembler, and there is no ending reset value included in primtype buffer 102, input assembler infers that the ending reset of the second subpath is a closed reset, and that vertices v7 and v4, the first and last vertices of the second subpath, are connected. Input assembler 44 generates a primID for the line primitive connecting v4 and v7, and then stores a representation of the line primitive, and the primID associated with the line primitive in resources block 64.

FIG. 4 illustrates but one example of how input assembler may generate primitive data based on a vertex buffer and a primtype buffer. Although illustrated as having only two subpaths, any number of subpaths may be possible. And, although FIG. 4 illustrates subpaths having only two path-rendering primitives, any number of path-rendering primitives may be included within a subpath. Even though FIG. 4 only illustrates a single primtype buffer and a single vertex buffer, input assembler 44 may process multiplexes vertex buffers and primtype buffers to generate primitive data as described above. Additionally, although primtype buffer 102 is illustrated as only having OR, CR, LINE, and QUAD values, other values, such as ARC (an eliptical arc), and higher order curve primitive type values may also be included in primtype buffer 102.

Figure 5:
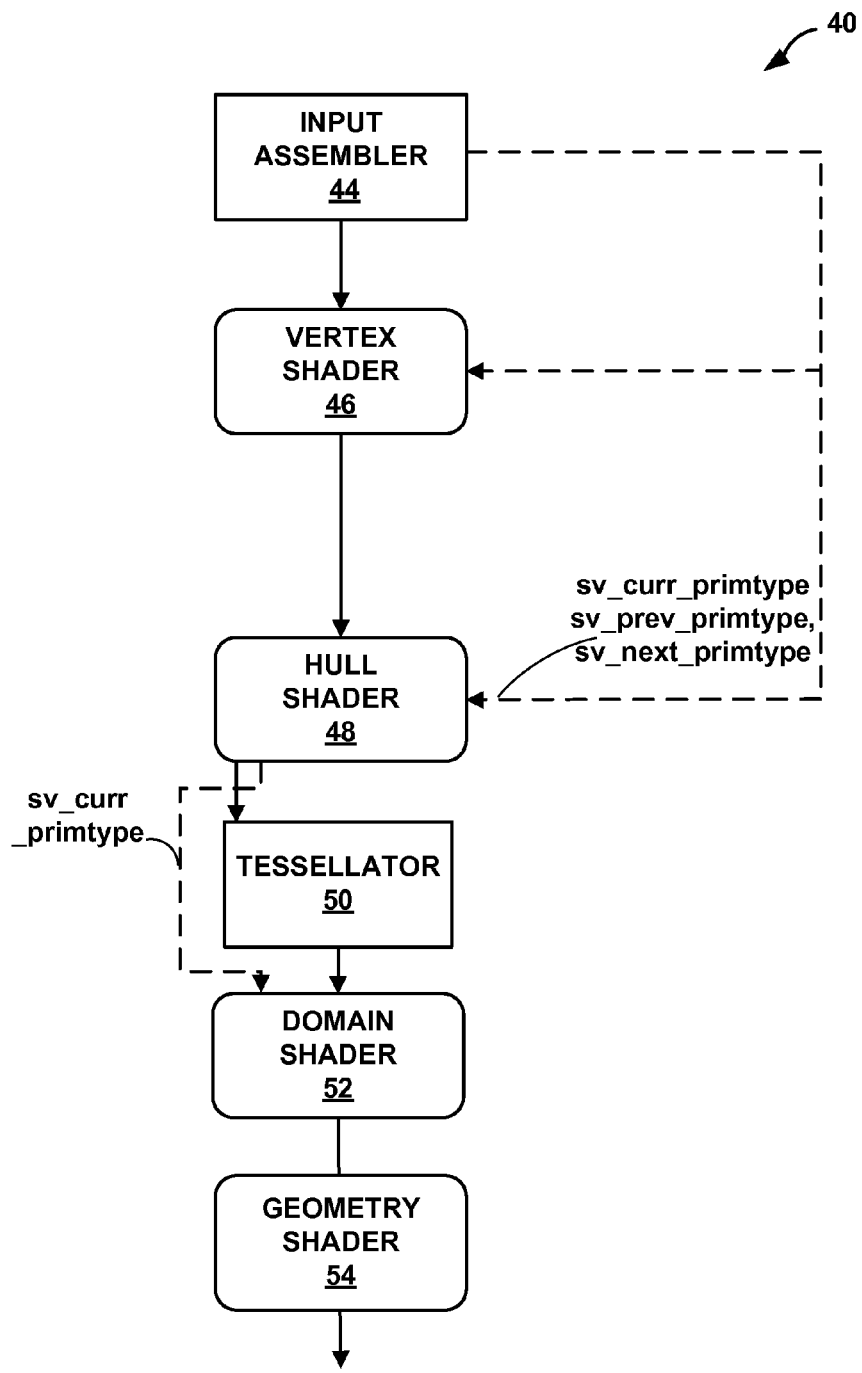
FIG. 5 is a conceptual diagram illustrating the path of state information through stages of a GPU in accordance with one or more examples of this disclosure.

FIG. 5 is a conceptual diagram illustrating the path of state information through stages of a GPU in accordance with one or more examples of this disclosure. FIG. 5 illustrates the passage of various pieces of primitive type state variable data, initially generated by input assembler 44, through graphics pipeline 40. As illustrated in FIG. 3, graphics pipeline 40 includes input assembler 44, vertex shader 46, hull shader 48, tessellator 50, domain shader 52, geometry shader 54, and resources block 64. As described above, input assembler 44 generates a representation of each path-rendering primitive, and stores each primitive in resources block 64, along with an associated primID.

For each primitive to be rendered, input assembler 44 may generate primitive state variables sv_curr_primtype, sv_prev_primtype, and sv_next_primtype. The sv_curr_primtype indicates the type of the current primitive that is currently being processed by one of the stages of graphics pipeline 40. The values of sv_prev_primtype and sv_next_primptype indicate the primitive types of the previously processed primitive, and the next primitive to be processed, respectively. Input assembler 44 may assign the values of sv_prev_primtype, sv_curr_primtype, and sv_next_primtype variables in a similar manner to the primID value.

In accordance with the techniques of this disclosure, input assembler 44 provides the sv_current_primtype and sv_next_primtype variables to hull shader stage 48. Based on the sv_current_primtype and sv_next_primtype variables, data for the current primitive retrieved from resources block 64, and input control points received from vertex shader 46, hull shader 48 generates and outputs tessellation factors to tessellator 50. Hull shader 48 also generates and outputs output control points, a starting normal of the next primitive to be processed, and tessellation factors, to domain shader 52.

Tessellator 50 receives tessellation factors from hull shader 48, and outputs domain coordinates in a u-v coordinate domain, as described above. Tessellator 50 outputs the u-v coordinates to domain shader 52 if streamout is disabled. If streamout is enabled, which is an option that may be used by an application for feeding back data from one stage of a graphics pipeline to an earlier stage of the graphics pipeline, tessellator 50 may output the domain coordinates back to resources block 64 for later use.

Domain shader 52 may generate vertices based on the domain coordinates and tessellation factors received from tessellator 50. Additionally, Domain shader 52 may support receiving a generating the vertices based on a variable number of control points received from hull shader 48. The variable number of control points may be indicated by the value of sv_curr_primtype received from hull shader 48.

FIG. 6 is a diagram illustrating code of a graphics API that, when executed, may cause a GPU to execute one or more of the techniques of this disclosure. FIG. 6 illustrates 17 lines of codes (referred to as "lines 1-17") example code of a graphics API, such as DirectX 11 or OpenGL. When the code of FIG. 6 is executed, lines 1-5 (140) GPU 12 may initialize or allocate resources for a vertex shader (line 1), hull shader (line 2), domain shader (line 3), geometry shader (line 4), and a pixel shader (line 5), respectively.

Lines 6 of lines 6-12 (122), when executed, may cause GPU 12 to allocate a constant buffer that includes a number of path-rendering primitives. Lines 7-12 define various join and stroking parameters for joining and stroking vector graphics path-rendering primitives that are to be rendered. Lines 13-17 (124) define a stride size (line 13), and an offset value (line 14), and allocate a vertex buffer that includes one or more primitives based on the stride and offset (line 15), sets a primptype buffer to point to a previously allocated primtype buffer (16), and includes a draw call (line 17).

On line 15, the offset argument indicates the starting index from which input assembler 44 begins reading the vertex buffer vertices, and the stride argument indicates defines how the vertex buffer vertices are arranged so the GPU may correctly access the vertices.

On line 16, the IASetPrimTypeBuffer call takes as a first argument a pointer to a primType buffer which has been previously allocated. The next argument defines the format of the values of the primtype buffer. In this example, the format is defined a 32-bit unsigned integer format. On line 17, the DrawPrimType call is a draw call that utilizes the defined vertex and primtype buffers of lines 15 and 16. The DrawPrimType buffer takes the number of primitives to be rendered (in this examples, 6) as its only argument. Upon execution, the DrawPrimType call causes GPU 12 to draw the primitives included in the vertex buffer.

Figure 7:
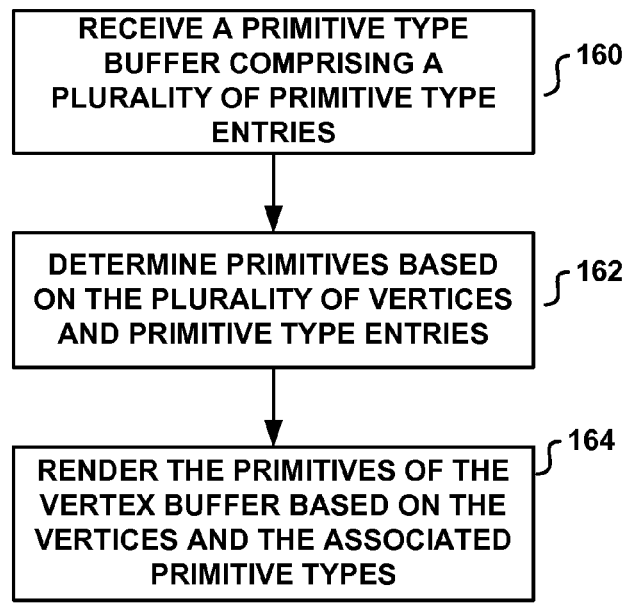
FIG. 7 is a flow diagram illustrating an example technique for performing GPU-accelerated path rendering according to this disclosure.

FIG. 7 is a flow diagram illustrating a method for performing GPU-accelerated path rendering according to this disclosure. The techniques shown in FIG. 7 are described as being performed by GPU 12 shown in FIGS. 1 & 2 and with graphics pipeline 40 shown in FIGS. 3 and 5 for exemplary purposes. In other examples, the techniques illustrated in FIG. 7 may be implemented in other systems that have same or different components in the same or a different configuration.

FIG. 7 is a flow diagram illustrating an example technique for performing GPU-accelerated path rendering according to this disclosure. For the purposes of example only, various stages of graphics pipeline 40 may perform the techniques illustrated in FIG. 7. In the process of FIG. 7, input assembler 44 of GPU 12 receives a primitive type buffer comprising a plurality of primitive type entries (160). In various examples, the primitive type entries may comprise vector graphics primitive type data. In some examples, the primitive type entries may include a plurality of an open reset, a closed reset, a line, a triangle, an arc, a quadratic curve, a cubic curve, and a quad.

Each of a plurality of vertices of the vertex buffer of the GPU may be associated with one or more of the plurality of primitive type entries. Input assembler 44 (or another stage of graphics pipeline 40, such as hull shader 48, domain shader 52, etc.) may determine primitives based on the plurality of vertices and the associated one or more primitive type entries (162). GPU 12 may then render the primitives based on the plurality of vertices and the associated one or more primitive type entries of the primitive type buffer (164).

In various examples, in the method of FIG. 7, input assembler 44 may be configured to determine an associated primitive type for each of the plurality of the vertices of the vertex buffer based on an entry of the entries in the primitive type buffer. Input assembler 44 may be further configured to output an indication of a current primitive type, a previous primitive type, and a next primitive type to hull shader 48 and domain shader 52.

In another example, hull shader 48 may receive from input assembler 44, primitive type data. Hull shader 48 may determine further one or more tessellation factors for tessellator 50 of the GPU, and determine a tessellation domain type based on the received primitive type data.

Tessellator 50 may receive from hull shader 48 the one or more tessellation factors. Tessellator 50 may further receive from hull shader 48 the tessellation domain type from hull shader 48, and tessellate the tessellation domain based on the one or more received tessellation factors. In another example, domain shader 52 may receive from tessellator 50, a plurality of domain coordinates. Domain shader 52 may also receive primitive type data from hull shader 48.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry such as discrete hardware that performs processing.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware, firmware, and/or software components, or integrated within common or separate hardware or software components.

The techniques described in this disclosure may also be stored, embodied or encoded in a computer-readable medium, such as a computer-readable storage medium that stores instructions. Instructions embedded or encoded in a computer-readable medium may cause one or more processors to perform the techniques described herein, e.g., when the instructions are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable storage media that is tangible.

Computer-readable media may include computer-readable storage media, which corresponds to a tangible storage medium, such as those listed above. Computer-readable media may also comprise communication media including any medium that facilitates transfer of a computer program from one place to another, e.g., according to a communication protocol. In this manner, the phrase "computer-readable media" generally may correspond to (1) tangible computer-readable storage media which is non-transitory, and (2) a non-tangible computer-readable communication medium such as a transitory signal or carrier wave.

Various aspects and examples have been described. However, modifications can be made to the structure or techniques of this disclosure without departing from the scope of the following claims.

What is claimed is:

1. A method performed by a graphics processing unit (GPU), the method comprising:
   receiving, by the GPU, a draw call command including, as arguments, a vertex buffer comprising a plurality of vertices and a primitive type buffer comprising a plurality of primitive type entries, wherein each vertex of the plurality of vertices of the vertex buffer is associated with one or more of the plurality of primitive type entries such that a first vertex of the plurality of vertices is associated with at least one of the plurality of primitive type entries and a second vertex of the plurality of vertices is associated with at least one of the plurality of primitive type entries, wherein the at least one of the plurality of primitive type entries associated with the first vertex is different from the at least one of the plurality of primitive type entries associated with the second vertex;
   determining, by the GPU, primitives based on the plurality of vertices and the associated one or more primitive type entries; and
   rendering, by the GPU, the primitives based on the plurality of vertices and the associated one or more primitive type entries of the primitive type buffer.

2. The method of claim 1, wherein the primitive type entries comprise vector graphics primitive data.

3. The method of claim 1, further comprising:
   determining, by an input assembler of the GPU, an associated primitive type for each vertex of the plurality of vertices of the vertex buffer based on an entry of the entries in the primitive type buffer.

4. The method of claim 1, further comprising:
   receiving, by a hull shader of the GPU, from an input assembler of the GPU, primitive type data;
   determining, by the hull shader, one or more tessellation factors for a tessellation unit of the GPU; and
   determining, by the hull shader, a tessellation domain type based on the received primitive type data.

5. The method of claim 4, further comprising:
   receiving, by a tessellation unit of the GPU, from a hull shader of the GPU, the one or more tessellation factors;
   receiving, by the tessellation unit, from the hull shader, the tessellation domain type from the hull shader; and
   tessellating, by the tessellation unit, the tessellation domain based on the one or more received tessellation factors.

6. The method of claim 1, further comprising:
   receiving, by a domain shader of the GPU, from a tessellation unit of the GPU, a plurality of domain coordinates; and
   receiving, by the domain shader, from a hull shader of the GPU, primitive type data.

7. The method of claim 1, wherein the primitive type entries include a plurality of: an open reset, a closed reset, a line, a triangle, an arc, a quadratic curve, a cubic curve, and a quad.

8. The method of claim 1, further comprising:
   outputting, by an input assembler of the GPU, an indication of a current primitive type, a previous primitive type, and a next primitive type to at least one of a hull shader stage of the GPU and a domain shader stage of the GPU.

9. A graphics processing unit (GPU) comprising:
   a memory configured to store a vertex buffer and a primitive type buffer; and
   at least one processor configured to:
      receive a draw call command including, as arguments, the vertex buffer comprising a plurality of vertices and the primitive type buffer comprising a plurality of primitive type entries, wherein each vertex of the plurality of vertices of the vertex buffer is associated with one or more of the plurality of primitive type entries such that a first vertex of the plurality of vertices is associated with at least one of the plurality of primitive type entries and a second vertex of the plurality of vertices is associated with at least one of the plurality of primitive type entries, wherein the at least one of the plurality of primitive type entries associated with the first vertex is different from the at least one of the plurality of primitive type entries associated with the second vertex;
      determine primitives based on the plurality of vertices and the associated one or more primitive type entries; and
      render the primitives based on the plurality of vertices and the associated one or more primitive type entries of the primitive type buffer.

10. The GPU of claim 9, wherein the primitive type entries comprise vector graphics primitive data.

11. The GPU of claim 9, wherein the GPU further comprises an input assembler, wherein the input assembler is configured to:
    determine an associated primitive type for each vertex of the plurality of vertices of the vertex buffer based on an entry of the entries in the primitive type buffer.

12. The GPU of claim 9, further comprising:
    an input assembler;
    a tessellation unit; and
    a hull shader, wherein the hull shader is configured to:
       receive from the input assembler of the GPU, primitive type data;
       determine one or more tessellation factors for a tessellation unit of the GPU; and
       determine a tessellation domain type based on the received primitive type data.

13. The GPU of claim 12, wherein the tessellation unit is configured to:
    receive from the hull shader the one or more tessellation factors;
    receive from the hull shader the tessellation domain type from the hull shader; and
    tessellate the tessellation domain based on the one or more received tessellation factors.

14. The GPU of claim 9, further comprising:
    a tessellation unit; and
    a domain shader, wherein the domain shader is further configured to:
       receive, from the tessellation unit of the GPU, a plurality of domain coordinates; and receive, from the hull shader, primitive type data.

15. The GPU of claim 9, wherein the primitive type entries include a plurality of: an open reset, a closed reset, a line, a triangle, an arc, a quadratic curve, a cubic curve, and a quad.

16. The GPU of claim 9, further comprising:
a hull shader stage;
a domain shader stage; and
an input assembler stage, wherein the input assembler is configured to:
output an indication of a current primitive type, a previous primitive type, and a next primitive type to at least one of the hull shader stage and the domain shader stage of the GPU.

17. An apparatus comprising:
means for receiving a draw call command including, as arguments, a vertex buffer comprising a plurality of vertices and a primitive type buffer comprising a plurality of primitive type entries, wherein each vertex of the plurality of vertices of the vertex buffer is associated with one or more of the plurality of primitive type entries such that a first vertex of the plurality of vertices is associated with at least one of the plurality of primitive type entries and a second vertex of the plurality of vertices is associated with at least one of the plurality of primitive type entries, wherein the at least one of the plurality of primitive type entries associated with the first vertex is different from the at least one of the plurality of primitive type entries associated with the second vertex;
means for determining primitives based on the plurality of vertices and the associated one or more primitive type entries; and
means for rendering the primitives based on the plurality of vertices and the associated one or more primitive type entries of the primitive type buffer.

18. The apparatus of claim 17, wherein the primitive type entries comprise vector graphics primitive data.

19. The apparatus of claim 17, further comprising:
means for determining an associated primitive type for each vertex of the plurality of vertices of the vertex buffer based on an entry of the entries in the primitive type buffer.

20. The apparatus of claim 17, further comprising:
means for receiving primitive type data;
means for determining one or more tessellation factors for a tessellation unit; and
means for determining a tessellation domain type based on the received primitive type data.

21. The apparatus of claim 20, further comprising:
means for receiving the one or more tessellation factors;
means for receiving the tessellation domain type; and
means for tessellating the tessellation domain based on the one or more received tessellation factors.

22. The apparatus of claim 17, further comprising:
means for receiving a plurality of domain coordinates; and
means for receiving primitive type data.

23. The apparatus of claim 17, wherein the primitive type entries include a plurality of: an open reset, a closed reset, a line, a triangle, an arc, a quadratic curve, a cubic curve, and a quad.

24. The apparatus of claim 17, further comprising:
means for outputting an indication of a current primitive type, a previous primitive type, and a next primitive type.

25. A non-transitory computer-readable storage medium storing instructions that, when executed, cause at least one processor to:
receive a draw call command including, as arguments, a vertex buffer comprising a plurality of vertices and a primitive type buffer comprising a plurality of primitive type entries, wherein each vertex of the plurality of vertices of the vertex buffer is associated with one or more of the plurality of primitive type entries such that a first vertex of the plurality of vertices is associated with at least one of the plurality of primitive type entries and a second vertex of the plurality of vertices is associated with at least one of the plurality of primitive type entries, wherein the at least one of the plurality of primitive type entries associated with the first vertex is different from the at least one of the plurality of primitive type entries associated with the second vertex;
determine primitives based on the plurality of vertices and the associated one or more primitive type entries; and
render the primitives based on the plurality of vertices and the associated one or more primitive type entries of the primitive type buffer.

26. The non-transitory computer-readable storage medium of claim 25, wherein the primitive type entries comprise vector graphics primitive data.

27. The non-transitory computer-readable storage medium of claim 25, further comprising instructions that, when executed, cause the at least one processor to:
determine, by an input assembler of the at least one processor, an associated primitive type for each vertex of the plurality of vertices of the vertex buffer based on an entry of the entries in the primitive type buffer.

28. The non-transitory computer-readable storage medium of claim 25, further comprising instructions that, when executed, cause the at least one processor to:
receive, by a hull shader of the at least one processor, from an input assembler of the at least one processor, primitive type data;
determine, by the hull shader, one or more tessellation factors for a tessellation unit of the at least one processor; and
determine, by the hull shader, a tessellation domain type based on the received primitive type data.

29. The non-transitory computer-readable storage medium of claim 25, further comprising instructions that, when executed, cause the at least one processor to:
receive, by a domain shader of the at least one processor, from a tessellation unit of the at least one processor, a plurality of domain coordinates; and
receive, by the domain shader, from a hull shader of the at least one processor, primitive type data.

30. The non-transitory computer-readable storage medium of claim 25, further comprising instructions that, when executed, cause the at least one processor to:
output, by an input assembler of the at least one processor, an indication of a current primitive type, a previous primitive type, and a next primitive type to at least one of a hull shader stage of the at least one processor and a domain shader stage of the at least one processor.

* * * * *